US008966211B1

(12) United States Patent
Arnon et al.

(10) Patent No.: US 8,966,211 B1
(45) Date of Patent: Feb. 24, 2015

(54) TECHNIQUES FOR DYNAMIC BINDING OF DEVICE IDENTIFIERS TO DATA STORAGE DEVICES

(75) Inventors: Dan Arnon, Somerville, MA (US); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 308 days.

(21) Appl. No.: 13/329,758

(22) Filed: Dec. 19, 2011

(51) Int. Cl.
| | | |
|---|---|---|
| G06F 12/00 | (2006.01) | |
| G06F 13/00 | (2006.01) | |
| G06F 13/28 | (2006.01) | |

(52) U.S. Cl.
USPC ........... 711/170; 370/338; 370/351; 370/389; 370/392; 709/208; 709/219; 709/220; 709/221; 709/223; 709/224; 709/225; 709/226; 711/112; 711/114; 711/162; 711/216

(58) Field of Classification Search
USPC ......................................................... 711/172
See application file for complete search history.

(56) References Cited

U.S. PATENT DOCUMENTS

| | | | | |
|---|---|---|---|---|
| 5,159,592 A | * | 10/1992 | Perkins .......................... | 370/338 |
| 5,247,638 A | * | 9/1993 | O'Brien et al. ................ | 710/68 |
| 5,267,351 A | * | 11/1993 | Reber et al. ............................ | 1/1 |
| 5,369,758 A | * | 11/1994 | Larson et al. ................ | 714/6.32 |
| 5,655,139 A | * | 8/1997 | Thomson et al. ............... | 712/32 |
| 5,666,511 A | * | 9/1997 | Suganuma et al. ............ | 711/114 |
| 5,671,441 A | * | 9/1997 | Glassen et al. ..................... | 710/8 |
| 5,696,933 A | * | 12/1997 | Itoh et al. ....................... | 711/114 |
| 5,721,854 A | * | 2/1998 | Ebcioglu et al. .............. | 712/203 |
| 5,742,792 A | | 4/1998 | Yanai et al. | |
| 5,748,963 A | * | 5/1998 | Orr ................................ | 717/131 |
| 5,784,552 A | * | 7/1998 | Bishop et al. ............... | 714/38.12 |
| 5,812,818 A | * | 9/1998 | Adler et al. ...................... | 703/23 |
| 5,819,063 A | * | 10/1998 | Dahl et al. ....................... | 703/27 |
| 5,848,229 A | * | 12/1998 | Morita .......................... | 714/6.32 |
| 5,949,985 A | * | 9/1999 | Dahl et al. ....................... | 703/26 |
| 5,949,993 A | * | 9/1999 | Fritz ................................ | 703/22 |
| 6,112,257 A | * | 8/2000 | Mason et al. .................... | 710/18 |
| 6,154,777 A | * | 11/2000 | Ebrahim ........................ | 709/227 |
| 6,175,869 B1 | * | 1/2001 | Ahuja et al. ................... | 709/226 |

(Continued)

OTHER PUBLICATIONS

Using NPIV to optimize Server Virtualization's Storage, Storage-Switzerland.com, retrieved from http://www.storage-switzerland.com/Articles/Entries/2009/6/11_Using_NPIV_to_Optimize_Server_Virtualizations_Storage.html on Dec. 6, 2013 (4 pages).*

(Continued)

*Primary Examiner* — Sanjiv Shah
*Assistant Examiner* — Daniel C Chappell
(74) *Attorney, Agent, or Firm* — Muirhead and Saturnelli, LLC

(57) ABSTRACT

Described are techniques for performing dynamic binding of device identifiers to data storage devices. A first device identifier assigned to an application on a host is received. The first device identifier is a unique detachable device identifier dynamically bound to different data storage devices at different points in time in accordance with data storage devices used by the application. The first device identifier is attached to a first data storage device of the data storage system used by the application at a first point in time. The first device identifier is detached from the first data storage device thereby making the first data storage device unavailable for data operations from the application. The first device identifier is attached to a second data storage device used by the application at a second point in time thereby making the second data storage device available for data operations from the application.

20 Claims, 29 Drawing Sheets

(56) References Cited

U.S. PATENT DOCUMENTS

| | | | |
|---|---|---|---|
| 6,230,114 B1* | 5/2001 | Hellestrand et al. | 703/13 |
| 6,324,543 B1* | 11/2001 | Cohen et al. | 1/1 |
| 6,360,276 B1* | 3/2002 | Scott | 709/245 |
| 6,425,762 B1* | 7/2002 | Ernst | 434/29 |
| 6,487,594 B1* | 11/2002 | Bahlmann | 709/225 |
| 6,594,698 B1* | 7/2003 | Chow et al. | 709/226 |
| 6,678,817 B1* | 1/2004 | Dua et al. | 712/205 |
| 6,681,267 B2* | 1/2004 | Ohmura et al. | 710/8 |
| 6,697,367 B1* | 2/2004 | Halstead et al. | 370/392 |
| 6,725,331 B1* | 4/2004 | Kedem | 711/117 |
| 6,745,241 B1* | 6/2004 | French et al. | 709/221 |
| 6,754,709 B1* | 6/2004 | Gbadegesin | 709/227 |
| 6,792,479 B2* | 9/2004 | Allen et al. | 710/10 |
| 6,795,709 B2* | 9/2004 | Agrawal et al. | 455/452.1 |
| 6,802,068 B1* | 10/2004 | Guruprasad | 719/319 |
| 6,845,428 B1* | 1/2005 | Kedem | 711/117 |
| 6,901,446 B2* | 5/2005 | Chellis et al. | 709/226 |
| 6,965,951 B2* | 11/2005 | Kim | 710/19 |
| 6,973,417 B1* | 12/2005 | Maxwell et al. | 703/2 |
| 6,973,586 B2* | 12/2005 | Petersen et al. | 714/6.31 |
| 7,000,086 B2 | 2/2006 | Meiri et al. | |
| 7,020,854 B2* | 3/2006 | Killian et al. | 716/102 |
| 7,035,929 B2* | 4/2006 | Agrawal et al. | 709/226 |
| 7,051,055 B1* | 5/2006 | Schneider | 1/1 |
| 7,054,883 B2 | 5/2006 | Meiri et al. | |
| 7,085,826 B2* | 8/2006 | French et al. | 709/221 |
| 7,088,703 B2* | 8/2006 | O'Hare et al. | 370/351 |
| 7,299,294 B1* | 11/2007 | Bruck et al. | 709/235 |
| 7,380,082 B2* | 5/2008 | Meiri et al. | 711/162 |
| 7,428,585 B1* | 9/2008 | Owens et al. | 709/223 |
| 7,469,279 B1* | 12/2008 | Stamler et al. | 709/221 |
| 7,469,281 B2* | 12/2008 | Kaneda et al. | 709/223 |
| 7,536,503 B1* | 5/2009 | Venkatanarayanan et al. | 711/112 |
| 7,546,354 B1* | 6/2009 | Fan et al. | 709/219 |
| 7,634,595 B1* | 12/2009 | Brown et al. | 710/38 |
| 7,680,957 B1* | 3/2010 | Ketterhagen et al. | 709/246 |
| 7,689,786 B1* | 3/2010 | Riordan et al. | 711/154 |
| 7,707,331 B1* | 4/2010 | Brown et al. | 710/38 |
| 7,711,711 B1* | 5/2010 | Linnell et al. | 707/652 |
| 7,712,092 B2* | 5/2010 | Bansal et al. | 717/153 |
| 7,730,210 B2* | 6/2010 | Kuik et al. | 709/245 |
| 7,774,436 B2* | 8/2010 | Woundy et al. | 709/220 |
| 7,814,274 B2* | 10/2010 | Howard et al. | 711/114 |
| 7,822,939 B1* | 10/2010 | Veprinsky et al. | 711/170 |
| 7,831,805 B2* | 11/2010 | Doering et al. | 712/34 |
| 7,856,022 B1* | 12/2010 | Wigmore | 370/395.71 |
| 8,019,842 B1* | 9/2011 | Kong et al. | 709/223 |
| 8,028,062 B1* | 9/2011 | Wigmore et al. | 709/224 |
| 8,028,110 B1* | 9/2011 | Wigmore | 710/74 |
| 8,060,710 B1* | 11/2011 | Don et al. | 711/161 |
| 8,065,276 B2* | 11/2011 | Pudipeddi et al. | 707/661 |
| 8,099,623 B1* | 1/2012 | Li et al. | 714/6.22 |
| 8,180,855 B2* | 5/2012 | Aiello et al. | 709/219 |
| 8,229,726 B1* | 7/2012 | Magdon-Ismail et al. | 703/20 |
| 8,271,955 B1* | 9/2012 | Lindahl et al. | 717/128 |
| 8,347,063 B2* | 1/2013 | Panesar et al. | 711/203 |
| 8,370,592 B1* | 2/2013 | Specht et al. | 711/162 |
| 8,468,578 B1* | 6/2013 | Lu et al. | 726/2 |
| 8,549,123 B1* | 10/2013 | Wilkinson et al. | 709/223 |
| 8,595,680 B1* | 11/2013 | Steinberg | 716/136 |
| 8,621,059 B1* | 12/2013 | Kong et al. | 709/223 |
| 2001/0047412 A1* | 11/2001 | Weinman, Jr. | 709/225 |
| 2002/0107933 A1* | 8/2002 | Choi | 709/208 |
| 2002/0129338 A1* | 9/2002 | MacDonell | 717/126 |
| 2002/0147957 A1* | 10/2002 | Matsui et al. | 716/11 |
| 2003/0055943 A1* | 3/2003 | Kanai | 709/223 |
| 2003/0069948 A1* | 4/2003 | Ma et al. | 709/220 |
| 2003/0069954 A1* | 4/2003 | Ma et al. | 709/223 |
| 2003/0069965 A1* | 4/2003 | Ma et al. | 709/225 |
| 2003/0131284 A1* | 7/2003 | Flanagan et al. | 714/38 |
| 2003/0172145 A1* | 9/2003 | Nguyen | 709/223 |
| 2003/0212781 A1* | 11/2003 | Kaneda et al. | 709/223 |
| 2003/0217248 A1* | 11/2003 | Nohl et al. | 712/208 |
| 2003/0225884 A1* | 12/2003 | Hayden | 709/226 |
| 2003/0229484 A1* | 12/2003 | Liokumovich et al. | 703/22 |
| 2004/0025052 A1* | 2/2004 | Dickenson | 713/201 |
| 2004/0064553 A1* | 4/2004 | Kjellberg | 709/224 |
| 2004/0078654 A1* | 4/2004 | Holland et al. | 714/13 |
| 2004/0107335 A1* | 6/2004 | Dua et al. | 712/205 |
| 2004/0210736 A1* | 10/2004 | Minnick et al. | 711/216 |
| 2004/0267830 A1* | 12/2004 | Wong et al. | 707/200 |
| 2005/0010618 A1* | 1/2005 | Hayden | 707/204 |
| 2005/0071823 A1* | 3/2005 | Lin et al. | 717/136 |
| 2005/0076314 A1* | 4/2005 | Matsui et al. | 716/1 |
| 2005/0086343 A1* | 4/2005 | Chellis et al. | 709/226 |
| 2005/0131955 A1* | 6/2005 | Borthakur et al. | 707/200 |
| 2005/0144199 A2* | 6/2005 | Hayden | 707/204 |
| 2006/0041656 A1* | 2/2006 | Li et al. | 709/223 |
| 2006/0112219 A1* | 5/2006 | Chawla et al. | 711/114 |
| 2006/0123057 A1* | 6/2006 | Zelenka et al. | 707/104.1 |
| 2006/0236064 A1* | 10/2006 | Niles et al. | 711/170 |
| 2006/0271341 A1* | 11/2006 | Brown et al. | 703/1 |
| 2006/0294167 A1* | 12/2006 | Borman et al. | 707/206 |
| 2007/0067573 A1* | 3/2007 | Bruening et al. | 711/125 |
| 2008/0082640 A1* | 4/2008 | Chang et al. | 709/220 |
| 2008/0101351 A1* | 5/2008 | Nguyen et al. | 370/389 |
| 2008/0177871 A1* | 7/2008 | Howard et al. | 709/222 |
| 2009/0077208 A1* | 3/2009 | Nguyen et al. | 709/221 |
| 2009/0089031 A1* | 4/2009 | Sturrock et al. | 703/7 |
| 2009/0089234 A1* | 4/2009 | Sturrock et al. | 706/45 |
| 2010/0115066 A1* | 5/2010 | Burnett et al. | 709/220 |
| 2010/0161875 A1* | 6/2010 | Chang et al. | 711/6 |
| 2010/0251012 A1* | 9/2010 | Zwisler et al. | 714/7 |
| 2011/0072225 A1* | 3/2011 | Kawaguchi et al. | 711/162 |
| 2011/0138124 A1* | 6/2011 | Hill et al. | 711/122 |
| 2011/0252270 A1* | 10/2011 | Abraham et al. | 714/4.1 |
| 2012/0011490 A1* | 1/2012 | Mizuno et al. | 717/127 |
| 2012/0260073 A1* | 10/2012 | Henry et al. | 712/221 |
| 2012/0278799 A1* | 11/2012 | Starks et al. | 718/1 |
| 2012/0324159 A1* | 12/2012 | Bopardikar et al. | 711/112 |
| 2013/0297917 A1* | 11/2013 | Nguyen et al. | 712/227 |

OTHER PUBLICATIONS

Fibre Channel World Wide Names, butler_richard@emc.com, Sep. 2007, retrieved from https://community.emc.com/servlet/JiveServlet/previewBody/5136-102-1-18154/WWN_Notes_v1.3.pdf on Dec. 5, 2013 (4 pages).*

Definition hot swap, Margaret Rouse and Alberto Accossato, Apr. 2005, retrieved from http://whatis.techtarget.com/definition/hot-swap on Dec. 5, 2013 (1 page).*

Data Center Technical Brief: How to Configure NPIV on VMware vSphere 4.0, Brocade, Jul. 2009, retrieved from http://www.brocade.com/downloads/documents/technical_briefs/NPIV_ESX4_0_GA-TB-145-01.pdf on Dec. 9, 2013 (25 pages).*

Definition World Wide Name (WWN), Margaret Rouse, May 2011, retrieved from http://searchvirtualstorage.techtarget.com/definition/World.*

Using NPIV to optimize Server Virtualization's Storage, Storage-Switzerland.com, retrieved from http://www.storageswitzerland.com/Articles/Entries/2009/6/11_Using_NPIV_to_Optimize_Server_Virtualizations_Storage.html on Dec. 6, 2013 (4 pages).*

U.S. Appl. No. 12/930,121, filed Dec. 29, 2010, "Witness Facility for Distributed Storage System".

U.S. Appl. No. 12/080,027, filed Mar. 31, 2008, "Active/Active Remote Mirroring".

U.S. Appl. No. 12/750,382, filed Mar. 30, 2010, "Multi-Machine Atomic Seamless Migration".

* cited by examiner

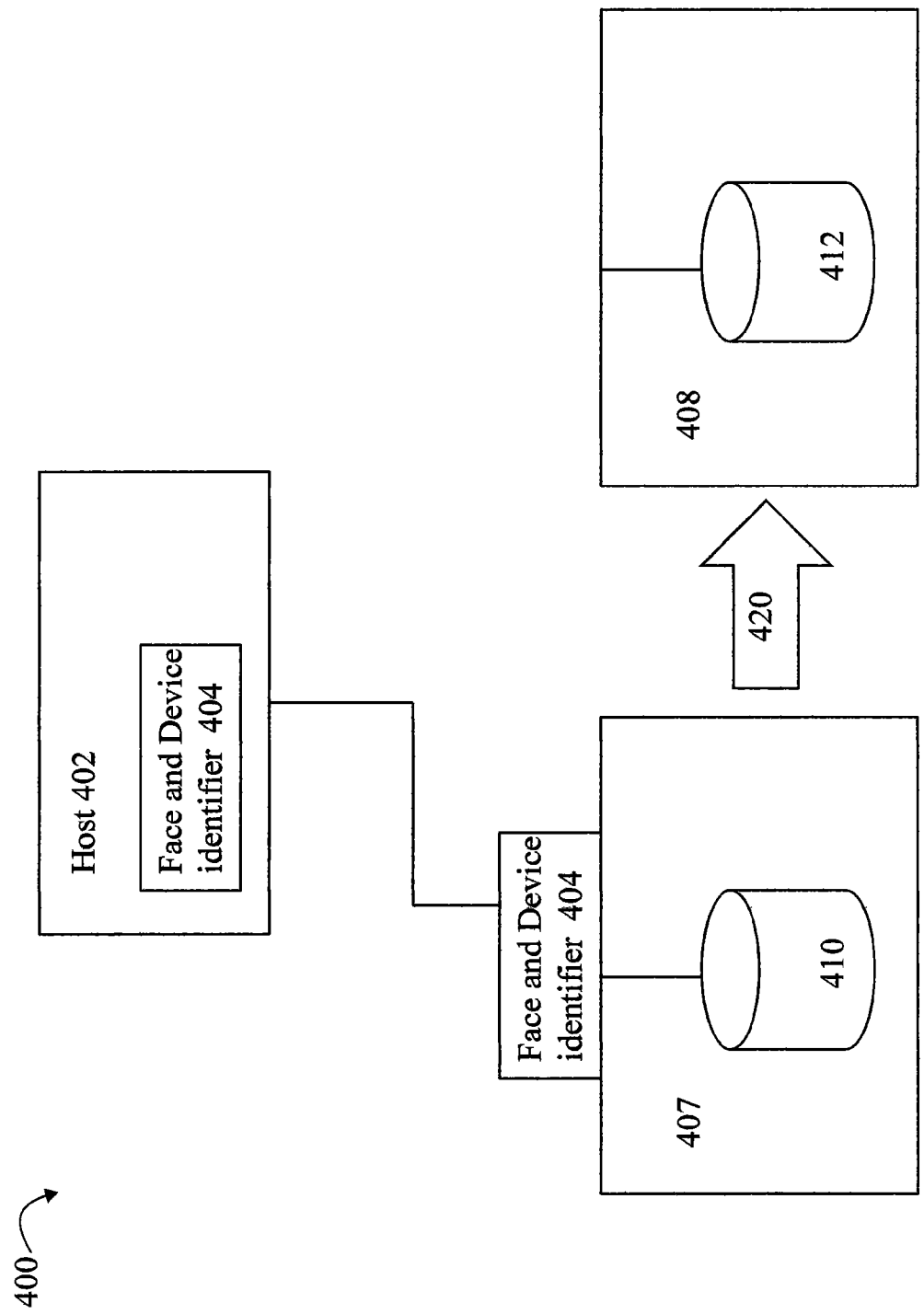

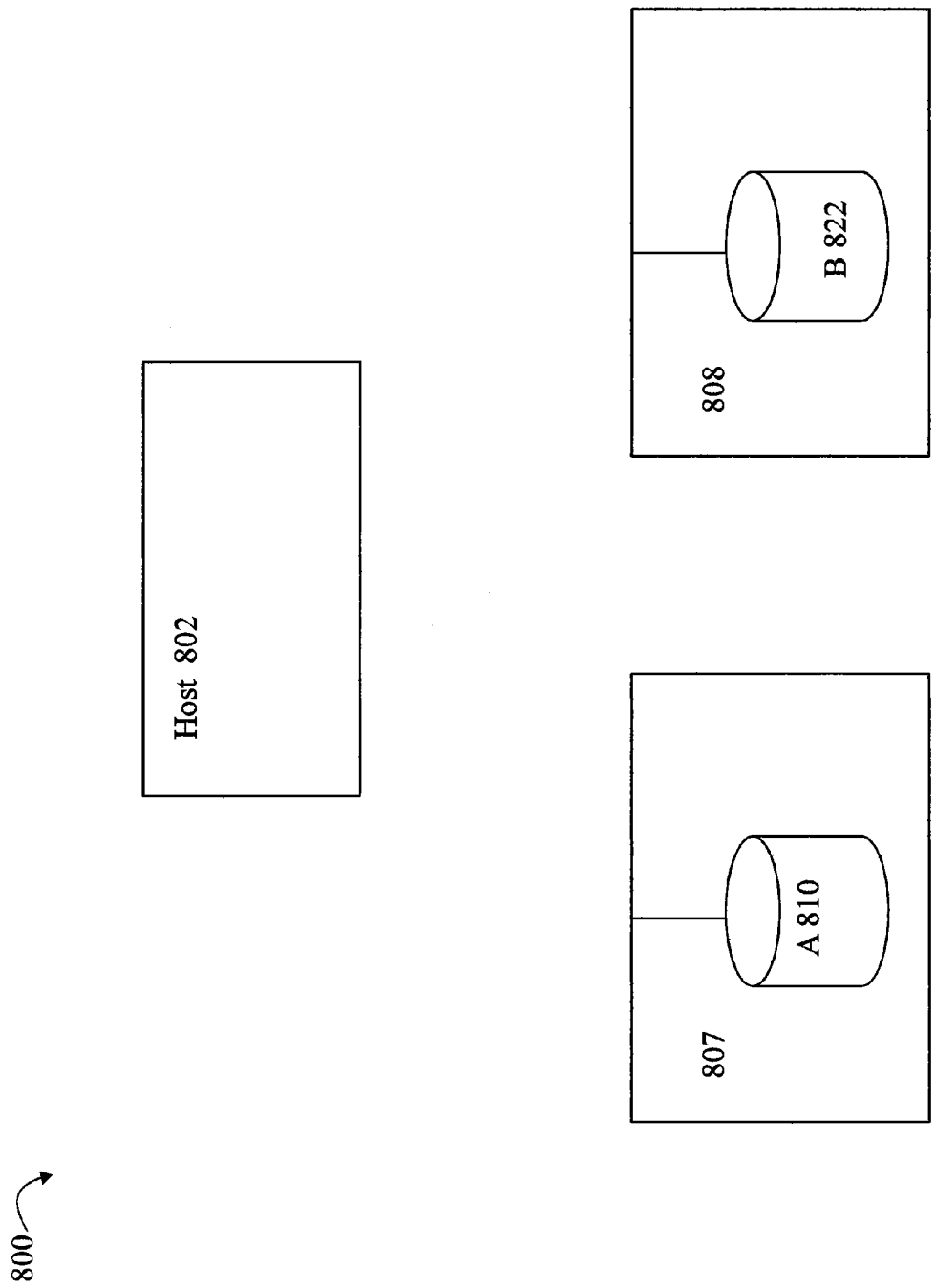

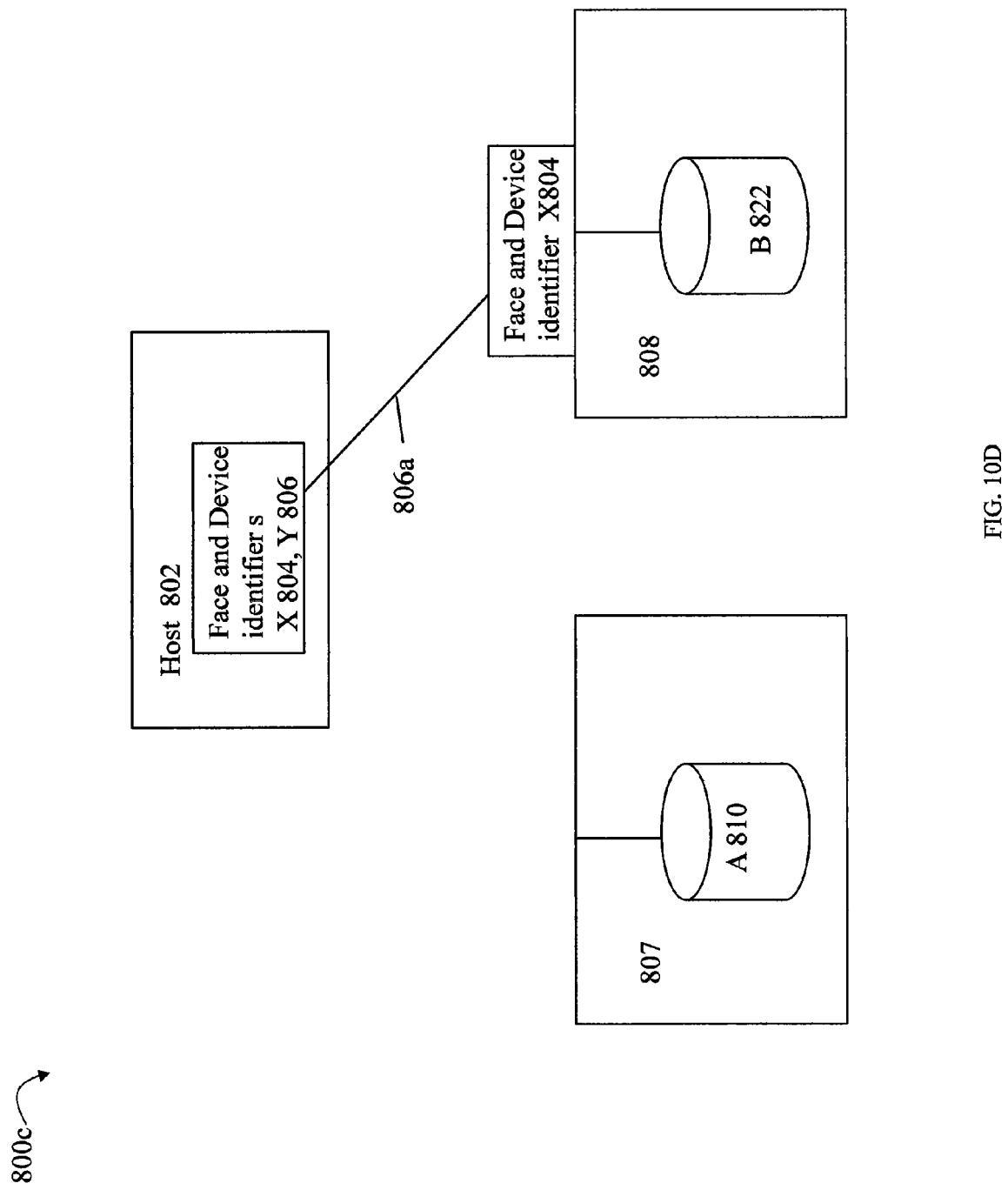

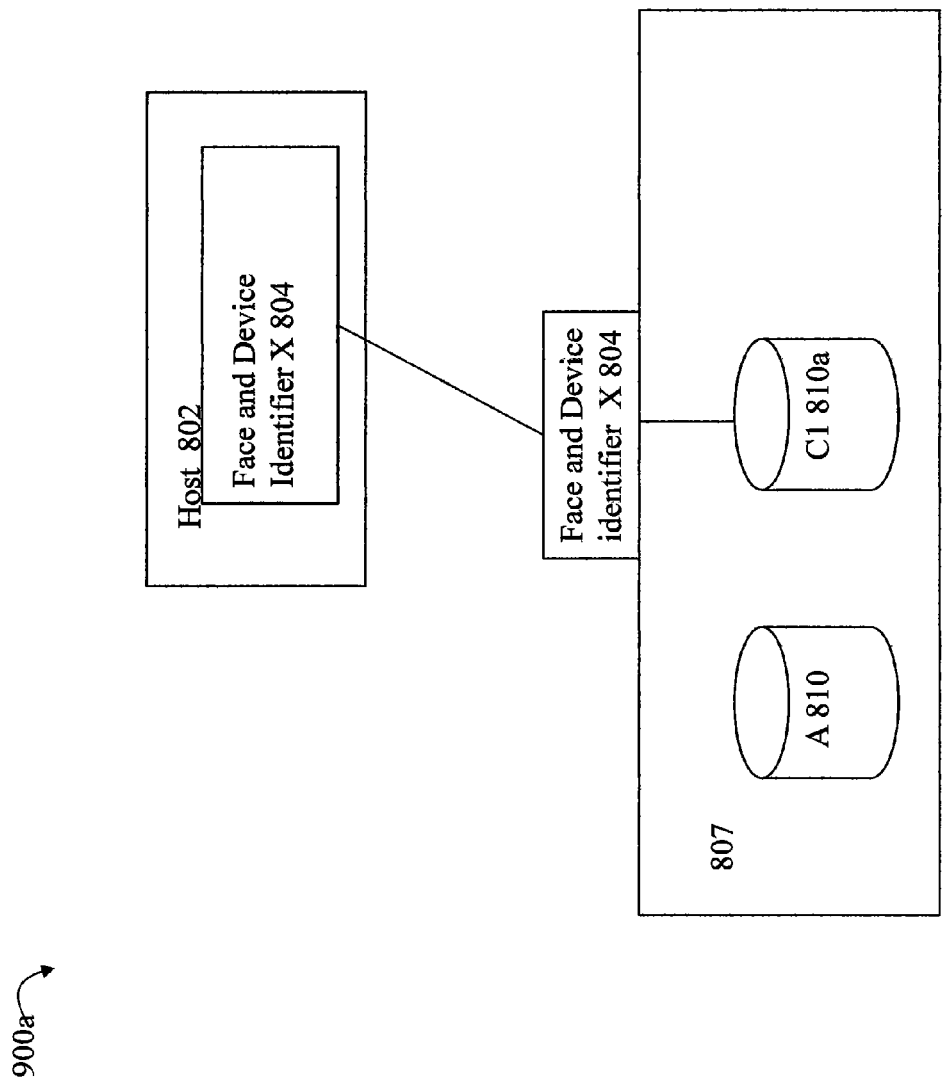

TECHNIQUES FOR DYNAMIC BINDING OF DEVICE IDENTIFIERS TO DATA STORAGE DEVICES

BACKGROUND

1. Technical Field

This application generally relates to data storage, and more particularly to techniques used in connection with device identifiers.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units (e.g., such as may be presented to the host as LUNs or logical unit numbers) may or may not correspond to the actual disk drives. Allowing multiple host systems to access the single storage device unit allows the host systems to share data stored therein.

Each of the data storage devices or volumes of the data storage system as exposed or presented to the host may be bound to a device identifier, such as a WWN (world wide name). The host may use the identifier in connection with directing I/O operations to the device such as I/O operations from an application having its data stored on a storage device bound to the identifier. Existing systems provide a static binding of identifier to the data storage device where the data storage system controls such static bindings and informs the host regarding such defined static bindings, for example, in response to the host performing discovery processing to discover paths from the host to data storage system devices. There are problems with the foregoing static bindings such as in connection with various use cases. For example, data used by the application may be migrated from a first storage device having a first device identifier to a second device having a second device identifier. In this manner, changes are required in connection with the host and/or application to use the second device identifier rather than the first device identifier. Such changes to use the new second device identifier may be disruptive to the application and may include, for example, reconfiguring and/or rebooting the host and/or application.

SUMMARY OF THE INVENTION

In accordance with one aspect of the invention is a method of performing dynamic binding of device identifiers to data storage devices comprising: receiving a first device identifier assigned to an application on a host, said application having its data stored on a data storage system, said first device identifier being a unique detachable device identifier dynamically bound to different data storage devices at different points in time in accordance with data storage devices used by the application; attaching the first device identifier to a first data storage device of the data storage system, said first data storage device including a first set of data used by the application at a first point in time; detaching the first device identifier from the first data storage device thereby making the first data storage device unavailable for data operations from the application; and attaching the first device identifier to a second data storage device that is different from the first data storage device, said second data storage device including a second set of data used by the application at a second point in time, said attaching the first device identifier to the second data storage device making the second data storage device available for data operations from the application. The first device identifier may include any one or more of a world wide name uniquely identifying a data storage device of the data storage system and a label written to a predetermined location on a data storage device to which the first device identifier is attached. The first device identifier may be assigned to the application for a lifetime of the application. Performing said detaching of the first device identifier from the first data storage device and said attaching the first device identifier to the second data storage device may result in the application using the second set of data rather than the first set of data without rebooting the host and without reconfiguring the application. The first device identifier may be one of a plurality of device identifiers assigned to the first application prior to connecting the host to the data storage system and prior to the host performing discovery processing to discover paths between the host and data storage devices of the data storage system, each of said plurality of device identifiers being a unique device identifier. There may be no device identifier attached to the second data storage device when said attaching is performed thereby indicating that the second data storage device is unavailable for data operations from any host and is not visible to any host. The first data storage device and the second data storage device may be block devices whereby the application accesses data on the devices for data operations in terms of blocks using block-based addresses. The plurality of device identifiers may be created by a device identifier factory on any of a host which stores data on the data storage system, a management computer system used to manage the data storage system, and the data storage system. The plurality of device identifiers may be included in faces of a face group for the application, wherein operations of attaching and detaching one of the plurality of device identifiers, respectively, may attach and detach a face including said one device identifier. Each of the faces may include a different one of the plurality of device identifiers and one or more other properties. The one or more properties may include any of a quality of service parameter, a capacity, a world wide name, a volume label, a description describing how a storage device attached to said each face is used by the application. The first data storage device may be included in a first data storage system and a third device may be included in a second data storage system and the first device identifier may be attached to the third data storage device at a same time the first device identifier is attached to the first data storage device. The first data storage device and said third data storage device may be configured as active mirrors of one another, wherein if the application writes first data to any one of the first and the third data storage devices, the first data is automatically replicated to the other of the first and the third data storage devices. The application may perform data operations to the first data storage device over a first path between the host and the first data storage system and may perform data operations to the third data storage device over a second path between the host and the second data storage system. A connection between the first and the second data storage systems used to replicate data between the first and the third data storage devices may fail thereby disabling operations to automatically replicate written data between the first and the third data storage devices, and in response to the connection failing, the method may include selecting one of the first and the third data storage devices; and detaching said first device identifier from said one storage device whereby said application issues data operations to the other of said first and said third data storage devices and is unable to issue data operations to said one data storage device. The first data storage device of a first data storage system and a third data storage device of a second data storage system may be configured as mirrors of one another, wherein the third data storage device is not bound to any device identifier thereby indicating that the third data storage device is not accessible for I/O operations to any host. If the application writes first data to the first data storage device, the first data is automatically replicated to the third data storage device, said application performing data operations to the first data storage device over a first path between the host and the first data storage system and the third data storage device is not accessible to the host over a path between the host and the second data storage system. If the first data storage device becomes unavailable to the application whereby the application is unable to access the first data storage device, then responsive to the first data storage device becoming unavailable to the application, the method may further include performing processing including attaching the first device identifier to the third data storage device. Prior to attaching the first device identifier to the second data storage device, the method may include migrating data from the first data storage device to the second data storage device and stopping I/O operations from the application directed to the first device identifier. After attaching the first device identifier to the second data storage device, the method may include resuming I/O operations from the application to the first device identifier. After attaching the first device identifier to the second data storage device, the method may include creating a new device identifier, assigning the new device identifier to a second application, and attaching the new device identifier to first data storage device thereby creating a path from the second application to the first data storage device, said second application issuing I/O operations directed to the new device identifier over the path.

In accordance with another aspect of the invention is a method of performing dynamic binding of device identifiers to data storage devices comprising: creating a first face assigned to an application on a host, said first face including a first device identifier that is a unique detachable device identifier dynamically bound to different data storage devices at different points in time in accordance with data storage devices used by the application; attaching the first face to a first data storage device of a first data storage system, said first data storage device including a first set of data used by the application at a first point in time; detaching the first face from the first data storage device thereby making the first data storage device unavailable for data operations of the application; and attaching the first face to a second data storage device of a second data storage system, said second data storage device including a second set of data used by the application at a second point in time, said attaching the first face to the second data storage device making the second data storage device available for data operations from the application.

In accordance with another aspect of the invention is a computer readable medium comprising code stored thereon for performing dynamic binding of device identifiers to data storage devices, the computer readable medium comprising code for: receiving a first device identifier assigned to an application on a host, said application having its data stored on a data storage system, said first device identifier being a unique detachable device identifier dynamically bound to different data storage devices at different points in time in accordance with data storage devices used by the application; attaching the first device identifier to a first data storage device of the data storage system, said first data storage device including a first set of data used by the application at a first point in time; detaching the first device identifier from the first data storage device thereby making the first data storage device unavailable for data operations from the application; and attaching the first device identifier to a second data storage device that is different from the first data storage device, said second data storage device including a second set of data used by the application at a second point in time, said attaching the first device identifier to the second data storage device making the second data storage device available for data operations from the application. The first device identifier may include any one or more of a world wide name uniquely identifying a data storage device of the data storage system and a label written to a predetermined location on a data storage device to which the first device identifier is attached. The first device identifier may be assigned to the application for a lifetime of the application. Performing said detaching of the first device identifier from the first data storage device and said attaching the first device identifier to the second data storage device may result in the application using the second set of data rather than the first set of data without rebooting the host and without reconfiguring the application. The first device identifier may be one of a plurality of device identifiers assigned to the first application prior to connecting the host to the data storage system and prior to the host performing discovery processing to discover paths between the host and data storage devices of the data storage system, each of said plurality of device identifiers being a unique device identifier.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6A, 6B and 6C are examples illustrating use of techniques herein with data migration;

FIGS. 8A, 8B, 8C, 9, 10A-10I are examples illustrating use of techniques herein with different data replication scenarios and configuration changes; and FIGS. 11A, 11B, 12A and 12B are examples illustrating use of techniques herein with various testing scenarios.

DETAILED DESCRIPTION OF EMBODIMENT(S)

Figure 1:
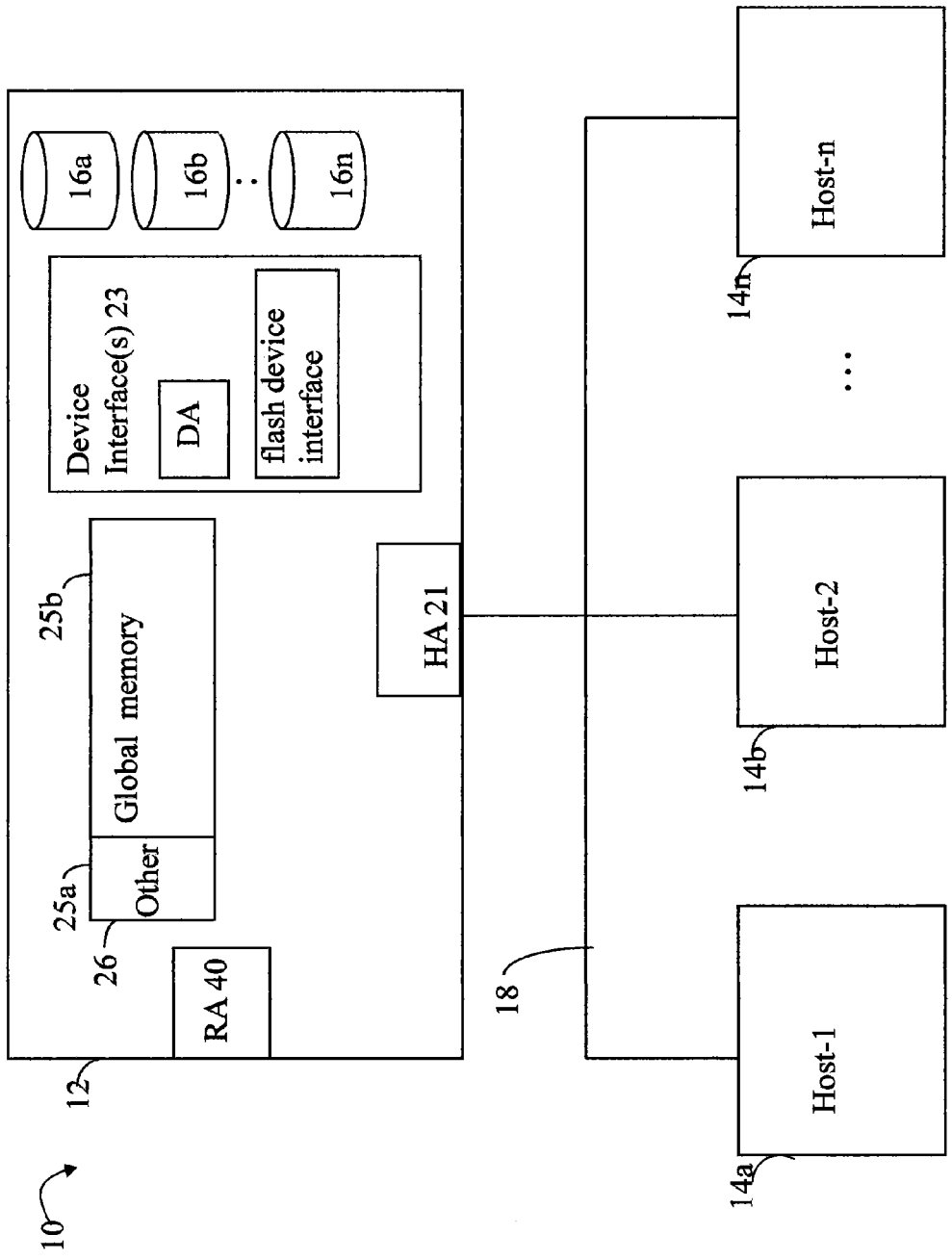
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more solid state drives (SSDs) and/or one or more rotating disk drives (e.g., SATA drives and others which are non-SSD drives). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. Some embodiments may define multiple storage tiers in which each such tier includes physical drives having performance characteristics different from drives of other storage tiers. For example, an embodiment may have a first highest performing storage tier of flash drives, a second middle performing storage tier of rotating disk drives (e.g., FC (fibre channel) disk drives) having first drive characteristics and a third (lowest) performing storage tier of rotating disk drives (e.g., SATA disk drives) having second drive characteristics.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). In one embodiment, LUNs (logical unit numbers) are data storage system devices such as may be presented to the host. The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. Multiple logical devices of the data storage system may also be concatenated and appear to the host as another logical entity such as a single metavolume. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, may physically access portions of a physical storage device in connection with performing I/O operations on a drive 16a-16n. Data residing on an LV may be accessed by the device interface following a data request in connection with I/O operations that other directors originate. Data may be accessed by LV in which a single device interface manages data requests in connection with the different one or more LVs that may reside on a drive 16a-16n.

Figure 2:
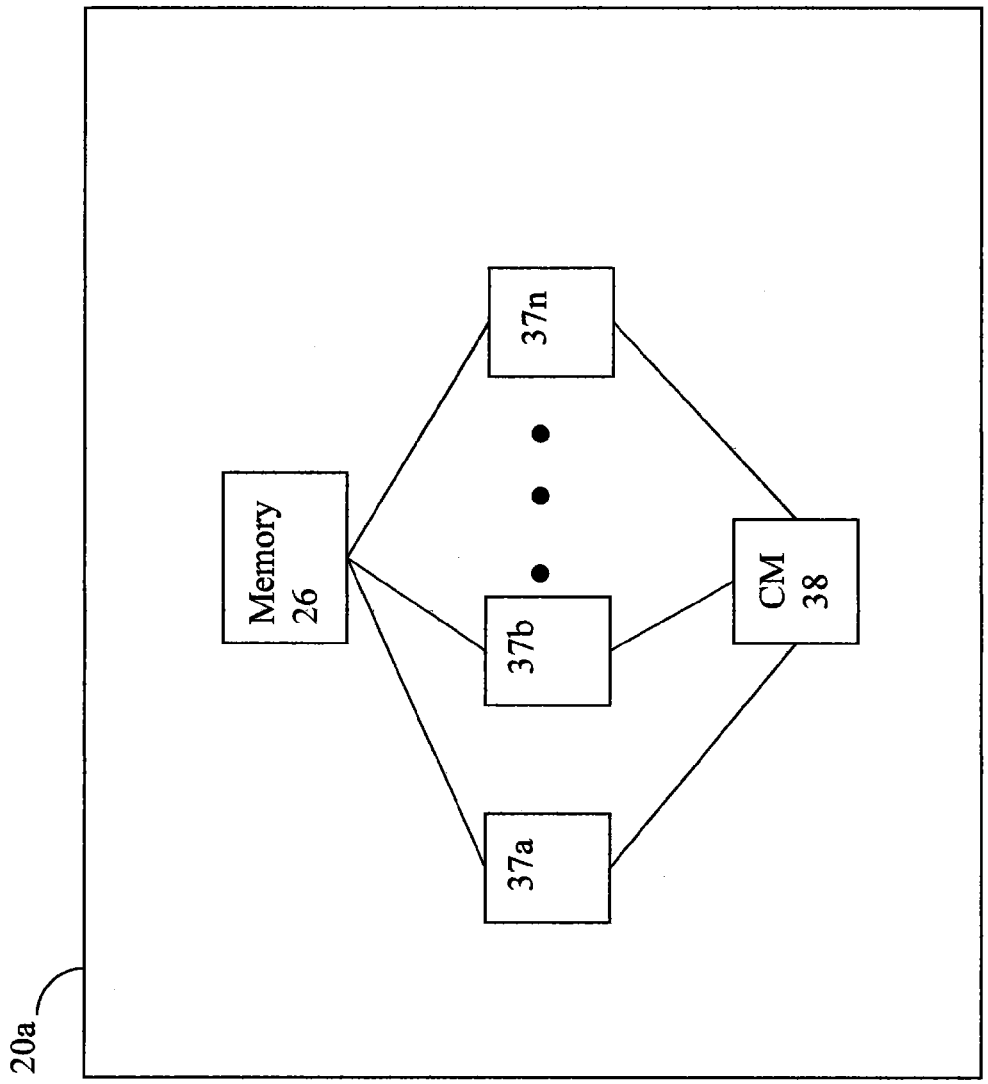
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX™ data storage array by EMC Corporation of Hopkinton, Mass. In the foregoing data storage array, the data storage devices 16a-16n may include a combination of disk devices (e.g., non-SSD storage devices) and flash devices (e.g., SSD-based storage devices) in which the flash devices may appear as standard Fibre Channel (FC) drives to the various software tools used in connection with the data storage array.

It should be noted that the I/O operations received, such as by an FA of the data storage system from a host, may be directed to a logical device or volume (LVs) of the storage system, a thin or virtually provisioned device, a metavolume, or more generally, any data storage device or storage entity presented to the host. Such host I/O requests may result in corresponding read and write requests or commands to the DA, controller or other backend physical device interface. As known in the art, a thin device may be characterized as logical device providing virtual provisioning that allows more storage capacity to be presented to a host, or an application thereon, than is physically available. Virtual provisioning in connection with thin devices may provide for allocating underlying physical storage for the thin device only when the storage is actually written to. The thin device is one type of logical device or, more generally data storage device, of the data storage system as may be exposed to the host.

It should be noted that the logical devices of the data storage system as exposed or presented to the host may be logical devices formed using one or more logical device layers on top of physical devices. As described above, an embodiment may also expose a physical device, or portion thereof, to the host as a data storage system device. Thus, a data storage system's storage device as presented or exposed to a client, such as a host, may be a storage entity having a storage capacity that represents the resulting storage entity as mapped to a portion of physical storage by the data storage system. The mapping layers on the data storage system may include, for example, those performing RAID configuration mapping between LUNs and the physical drives as well as any additional logical mapping as may be performed on a particular data storage system. Additionally, the host or client side may include one or more logical mapping layers in connection with further mapping an exposed data storage system device to another storage entity which is accessed/operated upon by an application on the host (e.g., to which the application may direct I/O operations).

In order for a host, or application executing thereon, to issue commands, data operations, and the like, to particular data storage devices of the data storage system, each such data storage device may be identified using an identifier also referred to herein as a device identifier. Such device identifiers may be further characterized as unique device identifiers enabling the host and data storage system to uniquely distinguish between different data storage devices associated with the device identifiers. In some embodiments, the device identifier may be a world wide name (WWN) or world wide identifier (WWID) which, as known in the art, is a unique identifier such as may be specified for each particular target of the data storage system. In existing systems not in accordance with techniques as described in more detail elsewhere herein, a static binding may be defined between a data storage device of the data storage system and an associated device identifier. In contrast, techniques described herein may be characterized as specifying a dynamic binding between a data storage device of the data storage system and an associated device identifier. Such device identifiers may be further characterized as detachable identifiers not tied in a fixed or static manner to any particular data storage system device and may be bound dynamically at different points in time to different data storage system devices. In accordance with techniques herein, the device identifiers may be assigned to an application and/or host upon which the application executes. Such device identifiers may be assigned to the application for the lifetime of usage of the application. As the application may use different data sets stored on different data storage system devices, the device identifiers used by the application may be dynamically bound to the different data storage system devices based on the particular application needs or uses at various points in time. For example, at a first point in time a device identifier may be bound to a first data storage system device. At a second later point in time, the device identifier may be bound to a second data storage system device. Thus, the device identifier binding, including a device identifier assigned to an application, changes dynamically based on the needs of the application. In this manner, the host and/or application may be characterized as owning the device identifier, driving the definition of the dynamic binding of the device identifier to a particular storage device, and determining when such dynamic binding may be updated based on the needs and data uses of the particular application (owned or assigned the device identifier). In connection with such dynamic binding of device identifiers to different data storage devices throughout the lifetime of an application, the application (and host upon which the application is executing) assigned such device identifiers may avoid disruption (e.g., reconfiguration, reboot, restart, and/or discovery) otherwise incurred each time the application and its host has to utilize new or different device identifiers. For example, in accordance with techniques herein with dynamic bindings of device identifiers to data storage devices, an application may continue to use the same device identifier as the device identifier is bound at a first time to a first storage device and at a second time to a second storage device. The foregoing example is in contrast to having the host use a first device identifier for the first storage device and a second device identifier for the second storage device whereby the application may have to be reconfigured and restarted to use the second device identifier. Additionally, depending on the particular host upon which the application is executing, the host may need to reboot and perform discovery for the application executing thereon to use the new second device identifier rather the first device identifier.

In connection with techniques herein, an embodiment may utilize a face in connection with representing the dynamic binding of a device identifier to a data storage device. The face may be a structure or object such as used in connection with data storage system management and may include a device identifier. The face may also optionally include other information regarding the dynamic binding and device identifier from the application or host perspective (e.g., regarding host and/or application usage of the device). A face may be assigned to an application in the same manner that the device identifier of the face is assigned to the application such as for use by the application during its lifetime. A face, and its device identifier, may be attached to a data storage device thereby representing the operation and process of connecting the face and its device identifier to the data storage device. In a similar manner, a face and its device identifier, may be detached from a previously attached data storage device thereby representing the operation and process of disconnecting the face and its device identifier from the data storage device. A face and its device identifier may exist without being attached to any data storage device or content. Similarly, a data storage device of a data storage system may exist without being connected to any face and without being connected to any device identifier whereby such data storage device may also be referred to as "faceless". Thus, as described in more detail below, attach and detach may be two operations performed by an application, or on behalf of an application, assigned a face.

A face group may be defined which is a list or grouping of multiple faces such as may be used by a single application. A face group may be managed and have operations performed thereon in a manner similar to a single face. Generally, a face group may correspond to any logical grouping such as devices used by an application noted above, a consistency group (where data on devices of the group is write order consistent), and other suitable groupings as may be used in an embodiment.

Faces and face groups assigned to particular applications may be managed and maintained by data storage system management software.

Figure 2B:
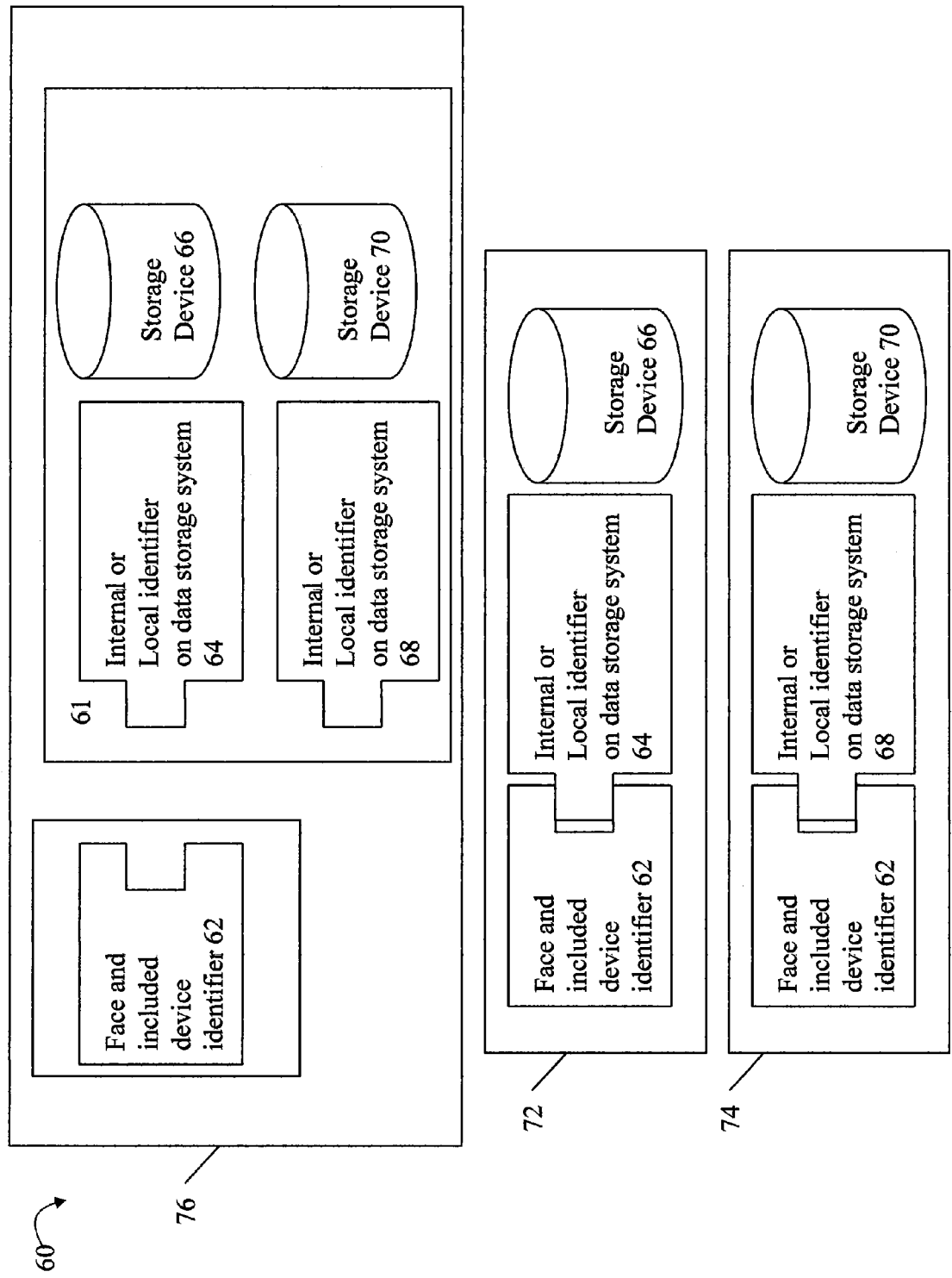
FIG. 2B is an example illustrating dynamic binding of a device identifier to various storage devices as may be performed in an embodiment in accordance with techniques herein.

Referring to FIG. 2B, shown is an example illustrating use of a face and included device identifier in connection with the dynamic binding to a data storage device. In the example 60, element 62 may represent the face and its device identifier as may be assigned to a host and/or application. Element 61 may represent information of the data storage system including data storage devices 66, 70. Devices 66, 70 may each have, respectively, internal or local identifiers 64, 68 as used internally on the data storage system to identify the particular storage devices. In this case, information of 61 may exist independent of the face and device identifier 62 as may be assigned to a host application whereby storage devices 66, 70 are faceless. Element 76 may represent the state of the storage configuration at a first point in time. Subsequently at a second point in time as illustrated by element 72, the application assigned face 62 may attach the face and its device identifier to data storage device 66 having internal data storage system identifier 64. Subsequently, the application may desire to use storage device 70 rather than 66. As a next step, the face and identifier 62 may be detached from storage device 66 thereby returning the storage configuration state to that as represented by 76. As a next step, the face and identifier 62 may be attached to storage device 70 having internal data storage system identifier 70 as represented be element 74. As described elsewhere herein in more detail, tables on the data storage system may reflect configuration information as represented by 61, 72 and 74 at various points in time. In this manner, the application and host assigned the face and included device identifier 62 does not have to be reconfigured to use new device identifiers other than 62 as needs and data uses of the application change over time. Rather, the data storage system configuration tables may be updated via the changes to the dynamic binding of device identifier to data storage device in accordance with the application data usage.

Figure 3:
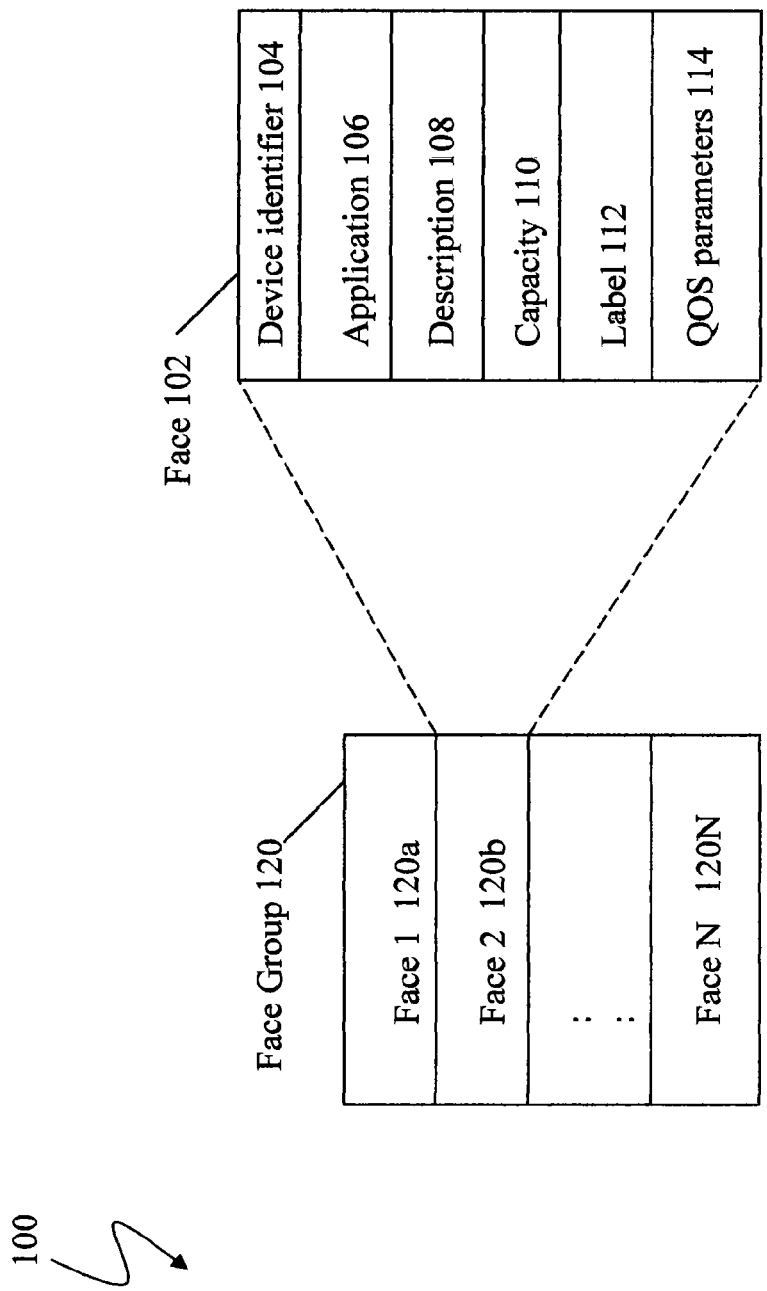
FIG. 3 is an example representation of a face group and information that may be included in a face in an embodiment in accordance with techniques herein.

As a further illustrative example, reference is now made to FIG. 3 providing an example 100 of a face group and detail on a face object as may be used in an embodiment in accordance with techniques herein. The example 100 includes a face group 120 of N faces 120a-120N. Each face, such as face 120b may be an object including a device identifier 104, an application 106 that is assigned or which owns the face, a description 108 describing how a storage device (attached to the face and device identifier) is used by the assigned application, a capacity or size 110, a volume label 112, and one or more quality of service (QOS) parameters 114. Although detail of 102 is illustrated as being applied to face 2 120b, each of the faces 120a-120N of the face group 120 may similarly include such items as illustrated in 102. To further illustrate, faces of face group 120 may be assigned to a database application executing on a host. The database application may use multiple data storage devices corresponding to face group 120 for a variety of different purposes such as, for example, to store data of the database, to store database logs, as scratch devices, and the like. The application may use a first face 120a with a first data storage device storing log data and a second face 120b with a second data storage device storing data or content of the database. The first face 120a may include a first device identifier assigned to the application, one or more quality of service (QOS) parameters indicating requirements particular to the storage of log data, a capacity or size requirement (such as a minimum capacity) needed for the log data, a volume label, and a description indicating that this face and its associated storage device is used to store database log data for the application. In a similar manner, the second face 120b may include the second device identifier assigned to the application, one or more quality of service (QOS) parameters indicating requirements particular to the storage of database content data, a capacity or size requirement (such as a minimum capacity) needed for the database content data, a volume label, and a description indicating that this face and its associated storage device is used to store database content data for the application.

A face may be further characterized as providing a front end identity from a host/application perspective of a device. A data storage device may be bound to at most one face and device identifier at a time. A faceless data storage device (or more generally one that is not bound to a device identifier) is inaccessible to any host and any application (e.g., no I/O operations may be directed to the storage device, the device is not discovered as part of device discovery as may be performed by a host, and there are no paths to the device such that the device is not visible to any host through a data storage system target port).

In connection with description and embodiments herein, the dynamic binding of a device identifier to a data storage device and operations associated therewith may be made with respect to a face or the device identifier. In some embodiments in accordance with techniques herein, the device identifier may be sufficient to uniquely identify a bound data storage device and such embodiments may choose to use only the device identifier rather than a face object or structure which may include additional information besides the device identifier. The device identifier may be, for example, a WWN or WWID, or another descriptor such as a label. In some embodiments, the label such as the volume label may be used to identify the storage device. In this manner, the label may be used as the device identifier and, in the case of block devices, may be physically written to the storage device at a well-known address as part of the attaching the storage device and may be cleared from the well-known address as part of detaching the storage device. Thus, in examples and description herein where a face, face group, etc. is utilized, the example and description may also be further applied for use with a device identifier, group of device identifiers, and the like.

Figure 4:
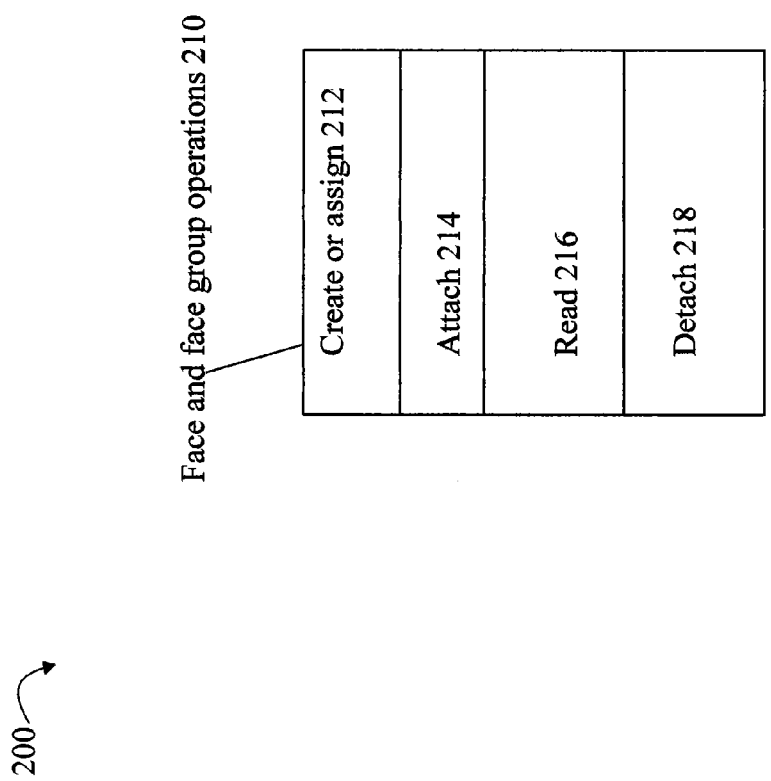
FIG. 4 is an example of operations that may be performed with respect to faces and face groups in an embodiment in accordance with techniques herein.

Referring to FIG. 4, shown is an example 200 of operations that may be included in an embodiment in accordance with techniques herein for faces and face groups. The example 200 represents that the operations 210 for faces and face groups may include create or assign 212, attach 214, read 216 and detach 218. An embodiment may include a create or assign operation 212 whereby a request is issued by an application, or other component on behalf of an application, to create a new device identifier and assign the new device identifier to the requesting application. In connection with creating a new face, the request may include other information that may be specified for a face object such as in 104-114 of the face 102 of FIG. 3. The create operation 212 may be issued by a user or software, such as a software agent on behalf of an application, to management software. In response, the management software may create the necessary management objects and obtain any new device identifiers.

In one embodiment, unique device identifiers may be generated by one or more device identifier factories that may be implemented using software located on any of a host, data storage system, management console or computer, and the like. Each factory may have a unique factory ID (identifier) and device identifiers may be generated by appending a next sequential number in a sequence to the unique factory ID. For example, there may be N factories each having a unique factory ID from 1 to N. Each such factory may generate unique device identifiers where each such device identifier generated by a factory having factory ID="X" is a concatenation or combination of "X" with a counter value denoting the next number Y in an integer sequence from 1 ... M. Each time factory X generates a new device identifier, the new device identifier may be "XY" and the current counter value Y may be incremented by one for use with the next generated device identifier.

An embodiment may also include an attach operation 214. Functionality of the attach operation is noted above to connect the face and its device identifier to a particular data storage device. An embodiment may require that the attach operation be performed with respect to a faceless data storage device thereby indicating that the data storage device is not currently in use by an application. As described above, "faceless" means that there is currently no client association or attachment to the storage device and that there is no device identifier currently assigned to the storage device. In one embodiment, if there is a device identifier and face attached to a storage device, the currently attached device identifier and face may be detached prior to attaching another face and device identifier. In other words, if an attachment operation is performed to attach a first face to a data storage system device and the device is currently attached to a second face, the attachment operation fails.

When performing an attach operation, the management software may issue appropriate commands or instructions to a data storage system to connect the particular storage device to the device identifier. The data storage system may include a table of information regarding which device identifier, if any, may be used by a client in connection with directing data operations to a particular storage device. Thus, such tables may associate the device identifier as used by the host and its application(s) to a data storage system internal identifier denoting the particular storage device and associated physical storage of the data storage system.

In connection with techniques herein, an application and host may have a device identifier independent of an attached storage device (e.g., without requiring that such device identifier be attached to a storage device). Similarly, a storage device may be "faceless" in that it is not attached to a face and device identifier.

With reference back to FIG. 3, a face 102 may include one or more items of optional information 104-114 in addition to the device identifier 104. Such optional information may include, for example, the capacity 110 and QOS parameters 114. Such QOS parameters may include, for example, performance characteristics such as specifying desired performance characteristics of physical drives, performance goals such as in terms of desired response times, and the like. The capacity 110 and/or one or more of the QOS parameters 114 may be used as criteria for selecting a storage device to be attached to a particular face. For example, an embodiment may select a storage device to be attached to a face based on matches between characteristics of the device and properties or information of a particular face. For example, a storage device may be selected based on matches between QOS parameters and physical device characteristics of a storage device, based on a match between capacity 110 and storage capacity of a storage device. It should be noted that if an embodiment includes a device identifier factory on the data storage system, the create operation may be performed as part of the attach operation for a new device identifier (e.g., when the input parameters for the attach operation do not specify an existing device identifier and associated existing face).

An embodiment may also include a read operation 216 as may be performed by a host to read from the data storage system the current face and associated device identifier for those storage device exposed (or visible) to the host.

An embodiment may also include an detach operation 214. Functionality of the detach operation is noted above to disconnect the face and its device identifier from a particular data storage device. When performing a detach operation, the management software may issue appropriate commands or instructions to a data storage system to disconnect the particular storage device from the device identifier. The data storage system may include the table of information regarding which device identifier, if any, may be used by a client in connection with directing data operations to a particular storage device as described above. Thus, in response to issuing a detach operation to detach a device identifier from a data storage device, a table of the data storage system associating the device identifier (as used by the host and its application(s)) with a data storage system internal identifier denoting the particular storage device may be updated to remove the device identifier from the table. Such updates to data storage system tables may be characterized as data storage system configuration changes which are driven by the application and/or host based on application and/or host data usage, policies and the like.

Commands to perform these operations and others that may be used to implement techniques herein may be issued by a user or software, such as a software agent on behalf of an application, to management software. In response, the management software may create the necessary management objects, obtain any new device identifiers, issue management commands to the data storage system to update appropriate tables, and the like.

As one example illustrating use of techniques herein in connection with provisioning for an application, consider the database application as described above which will have its data stored on devices of a data storage system. With techniques herein, processing may be performed to configure the device identifiers used by the application as part of application configuration and installation. Such configuration may be performed without even having purchased a data storage system or otherwise having such data storage system connected to the host upon which the application will execute. In accordance with techniques herein, one or more create operations may be performed on behalf of the host or database application (such as manually by a user or using automated scripts and code executed as part of application installation and/or configuration). The database application may need a number of data devices, log devices and scratch devices. With technique herein, the appropriate create operations may be performed to configure the faces for the application which may not yet be attached to any storage devices. Such attachment operations may be performed at a later point in time subsequent to application installation and configuration. Such operations for configuring storage for the application may be performed without having the host perform discovery processing to discover accessible or exposed device of the storage system. In connection with techniques herein, an embodiment may be characterized as shifting from discovered data storage devices to host-configuration of such data storage devices. Such an embodiment in accordance with techniques herein may be further characterized as moving from a pull model (whereby identities of data storage devices or volumes are first supplied by the data storage system and then secondly discovered by data storage clients such as applications which then use the discovered identities to configure the applications) to a push model (whereby the application or more generally a client is firstly assigned a set of identities for data storage devices or volumes to be used by the client according to the client's data storage needs and then secondly where the client-configured set of identities is pushed to the data storage system for the data storage system to accordingly configure its data storage devices based on the set of identities and also optionally in accordance with other attributes specified by the client).

What will now be described are various exemplary use cases of how an embodiment may utilize the techniques herein. One usage is in connection with provisioning and device configuration for an application. Aspects of this are described above and will now be described in more details.

Figure 5A:
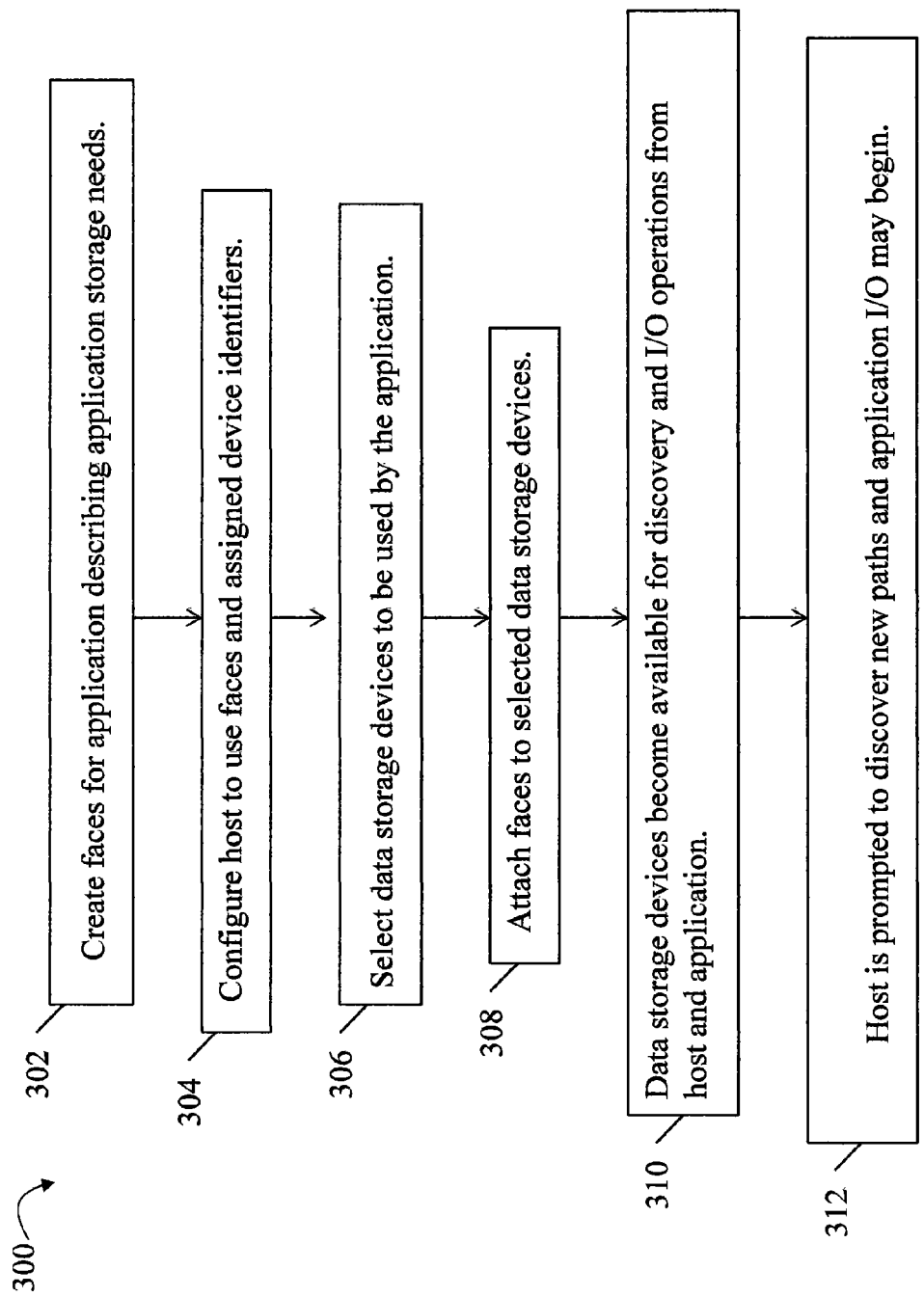
FIGS. 5A, 5B, 6D, 7 are flowcharts of processing steps as may be performed in an embodiment in accordance with techniques herein.

Referring to FIG. 5A, shown is an example of processing steps as may be performed in an embodiment in accordance with techniques herein in connection with provisioning and configuring storage for use by an application. In step 302, faces for the application are created describing the application storage needs. Step 302 may include performing one or more create commands to create one or more faces and/or face groups for the application and accordingly assign the faces and device identifiers to the application and host upon which the application executes. In step 304, the host is configured to use the created faces and assigned device identifiers from step 302. Processing of step 304 may vary with the application and operating system of the host. For example on a Unix-based operating system, step 304 may include issuing system calls to create new device files in the /dev directory that correspond to the new faces. In addition, the application may have configuration files that connect the symbolic names used by the application (e.g. my log file) to actual devices that are recognized by the operating system, such as one of the new device files that were just created in /dev. Other operating systems may have different procedures, but in general, such configuration as in connection with step 304 may include the creation of new objects in the operating system (e.g., such as special device files in the Unix case) and creating configuration files that are specific to the application, that contain pointers to these objects.

In step 306, data storage devices of one or more data storage systems are selected for use by the application. In step 308, the faces created from step 302 are attached to the selected storage devices. In one embodiment as described herein, steps 306 and 308 may be performed in combination as part of the attach operation for each device, for example, by matching criteria of a face with an available data storage device. Step 308 may also include the management software issuing appropriate commands to the one or more data storage systems including the selected devices to update data storage configuration information to reflect the current dynamic bindings specified by the attach operations. In step 310 as a result of completing the attach operations of step 308, the data storage devices are exposed or visible to the host and are now available for discovery, I/O operations, and the like. In step 312, the host may be prompted to discover the new paths to the data storage devices configured as part of the dynamic bindings. Subsequently, the application may commence I/O operations to the data storage devices bound to its assigned device identifiers. It should be noted that the host may be prompted in step 312 to perform discovery processing to discover the data storage devices and associated paths from the host configured in connection with previous steps. For example, the data storage system(s) including the storage devices bound to the device identifiers may issue a unit attention command in an embodiment in accordance with the SCSCI standard. As another example, a host may be prompted to perform discovery via an manual request such as may be triggered through a user input selection on a user interface which initiates host discovery of new devices.

It should be noted that steps 302 and 304 may be performed, for example, by an application administrator and steps 306 and 308 may be performed, for example, by a data storage administrator.

Figure 5B:
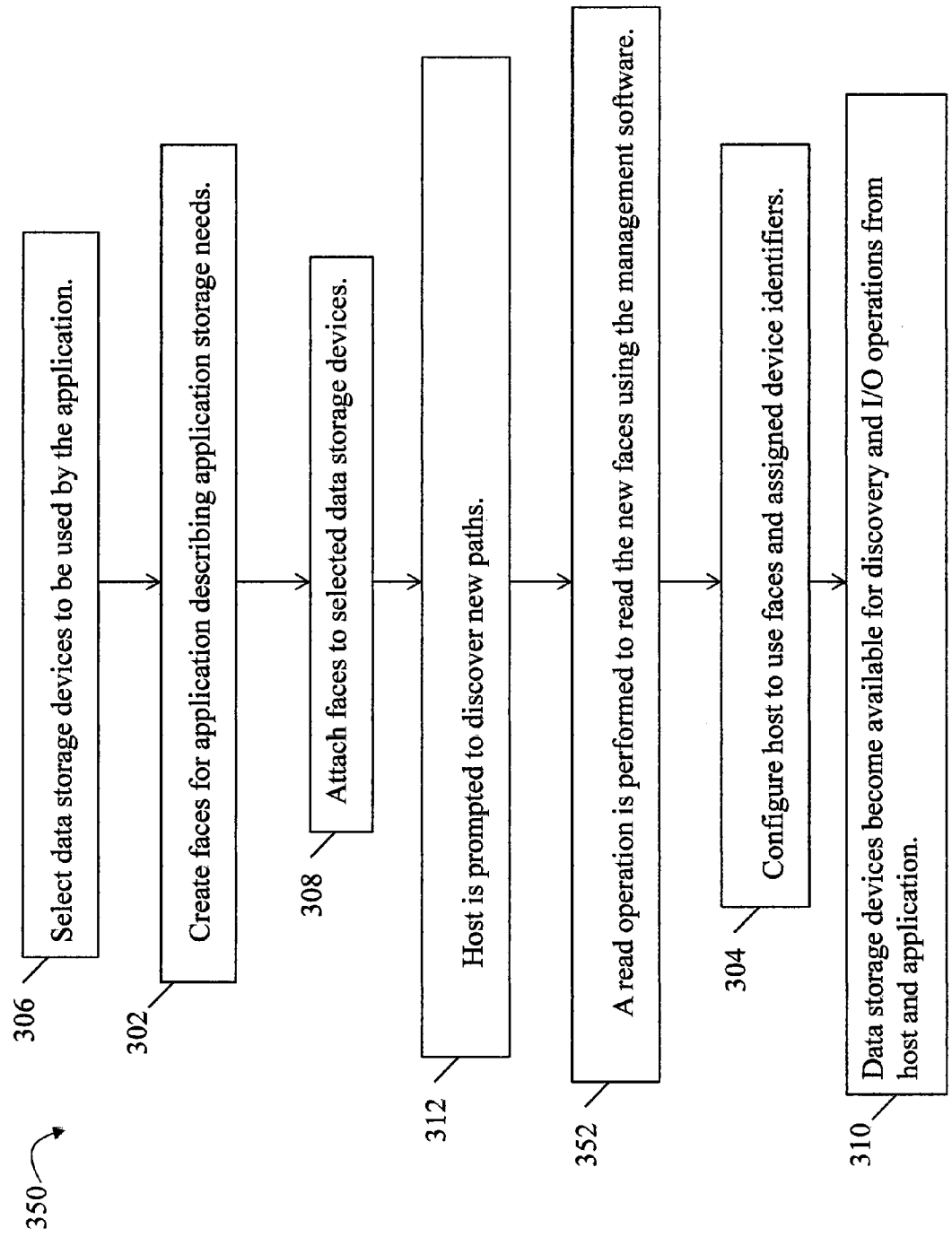

Referring to FIG. 5B, shown is another example of processing steps as may be performed in an embodiment in accordance with techniques herein in connection with provisioning and configuring storage for use by an application. The steps in 5B may be used, for example, in the case where legacy management is trying to provision face-enabled storage. The steps in FIG. 5B may be characterized as compatible with the steps taken by existing management software, and so provide an example use of techniques herein in connection with providing backward compatibility. The steps of FIG. 5B include steps of FIG. 5A as similarly numbered. Additionally, FIG. 5B includes the steps of FIG. 5A performed in a different order and also include the additional step 352 where a read operation is performed. Step 306 includes selecting the storage devices of the data storage system whereby such devices are faceless. In one embodiment, steps 302 and 308 may be performed by instructing the data storage system (e.g., commands issued from the host on behalf of the application) to perform such steps, for example, where the data storage system includes software to create and attach faces and includes software for a device identifier factory to generate new device identifiers. In step 352, the read operation may be performed by issuing a command to data storage system management software to obtain the faces as created by the data storage system.

As another exemplary use case, the techniques herein may be used in connection with performing offline data migration with reference now to FIGS. 6A-6D.

Figure 6B:
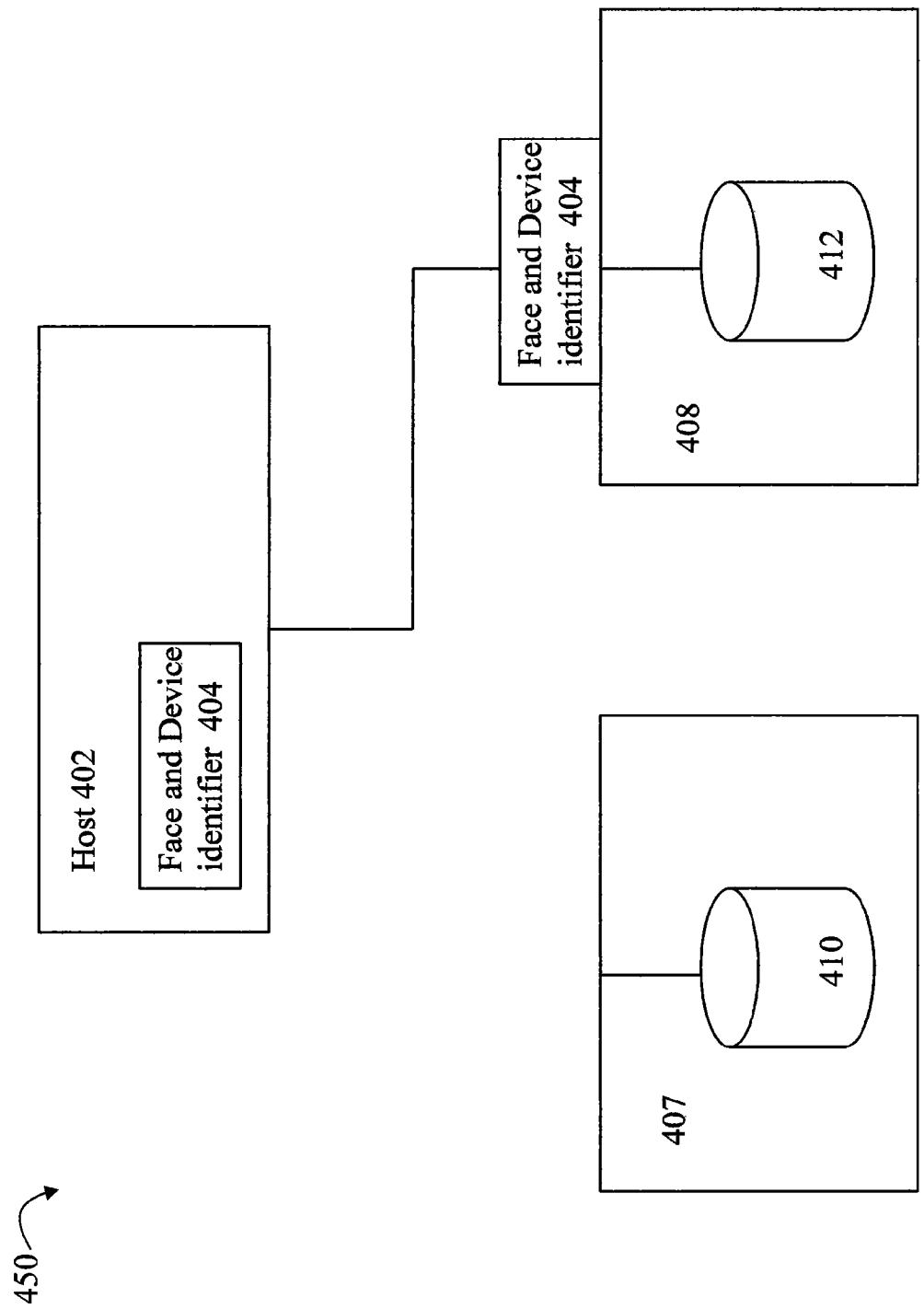
Figure 6C:
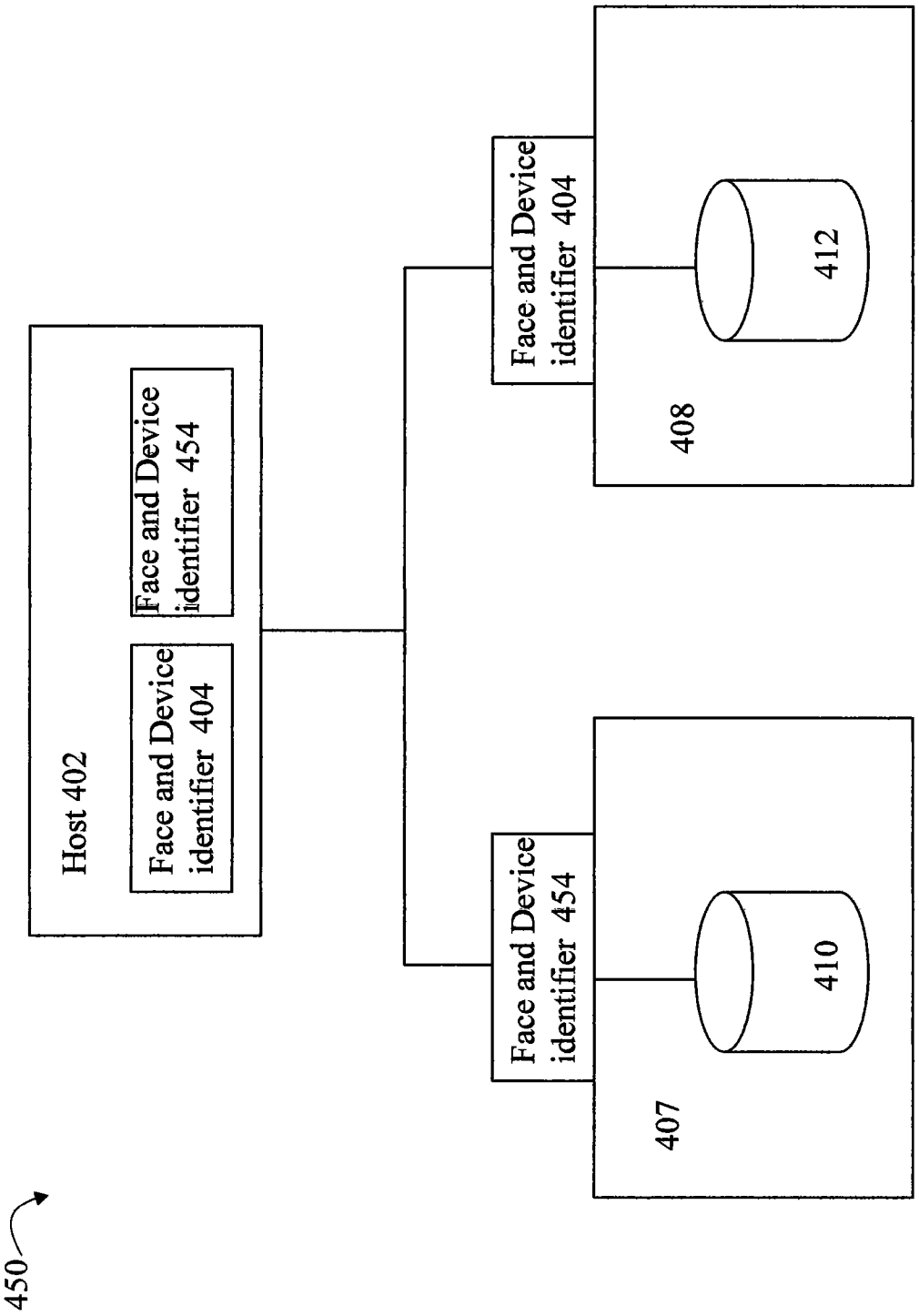

In FIG. 6A, illustrated is a host 402 assigned a face and device identifier 404. Element 407 may represent the source data storage system 407 including source device 410 currently attached to face and device identifier 404. Element 408 may represent the target data storage system including the target device 412. The source device 410 may be characterized as a donor device having data thereon which is to be migrated to target device 412. The host 402 is currently using data from device 410 (e.g., as represented by the path and connecting line from 407/410 and 404. As a result of the migration, the host 402 will use the same set of data which will be accordingly moved to device 412. Device 412 is currently faceless as represented by no paths or connecting lines between 404 and 408/412. As illustrated by arrow 420, data migration tools may be used to copy or migrate data from source device 410 to target device 412. The application on host 402 using device 410 may be stopped temporarily (e.g. no application I/O issued to device 410). The face and device identifier 404 from the source data storage system 407 may be obtained (via a read operation) by management software if such management software does not currently contain a definition for face and device identifier 404. The face and device identifier 404 may be detached from source device 410 and then attached to target device 412 as illustrated by FIG. 6B. The application on host 402 may now be restarted to use the target data storage device 412 associated with the face and device identifier 404. Additionally, if desired, operations may be performed to enable reuse of the source device 410. For example, as illustrated in FIG. 6C, a create operation may be performed to assign a new face and device identifier 454 to the application on host 402, followed by an attach operation to attach the new face and device identifier 454 to device 410.

Figure 6D:
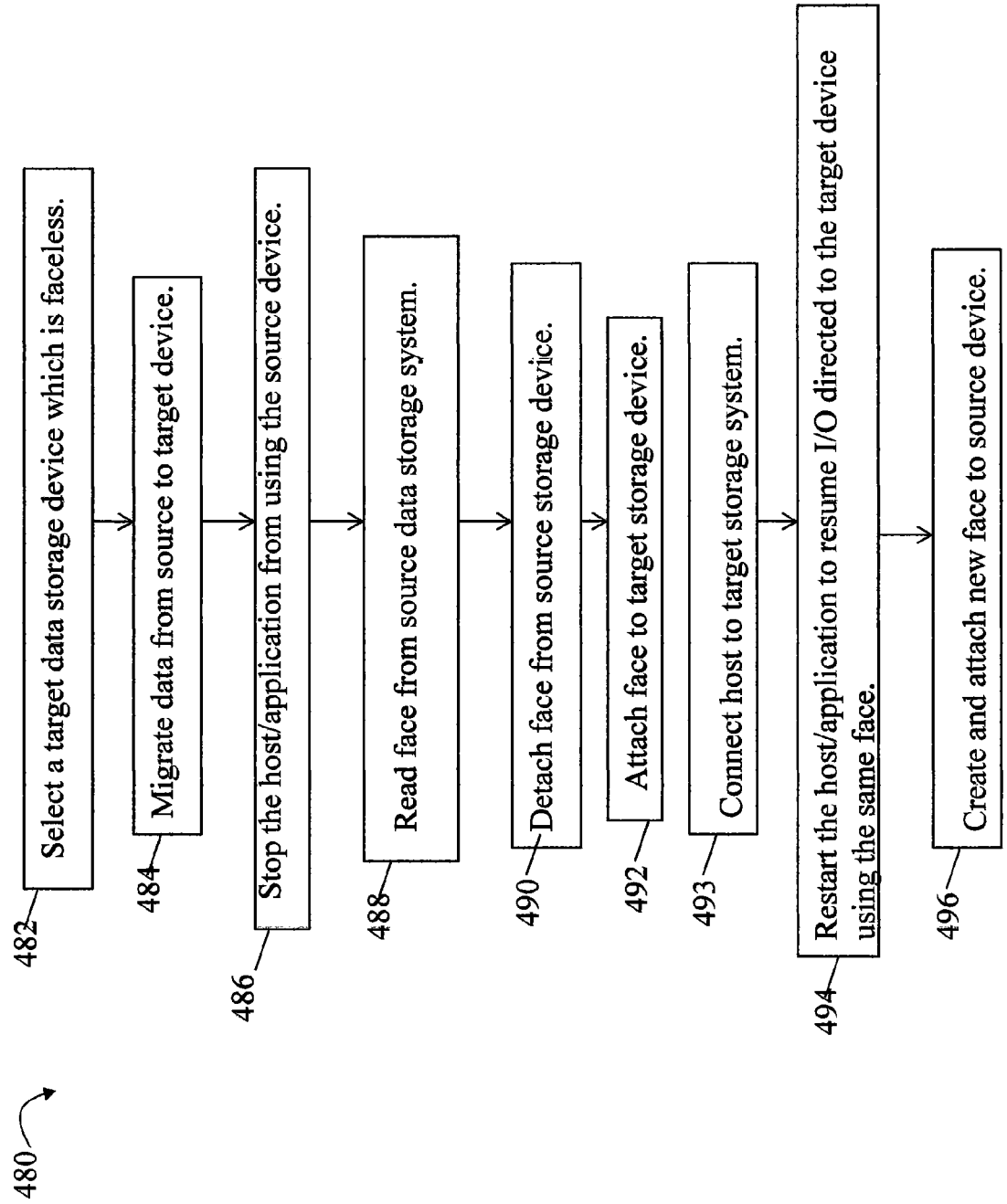

Referring to FIG. 6D, shown is a flowchart of processing steps as may be performed in an embodiment in connection with offline migration. The flowchart 480 summarizes processing as described above. In step 482, a target data storage device is selected for the migration target whereby such device is faceless. In step 484, data is migrated from the source to the target device. In step 486, the application of the host using the source device may be stopped. At step 488, the face is read from the source data storage system for inclusion and definition in the management software if such face definition is not already included. In step 490, the face is detached from the source device and attached in step 492 to the target device. At step 492, the host and application are connected to the target data storage system. At step 494, the application of the host may be restarted to resume I/O operations now directed to the target device using the same face as previously bound to the source device. In this manner, there is no need for host reconfiguration to use a new face and new device identifier for the target device. In step 496, if desired, a new face may be created and attached to the source device thereby enabling the application (or another application) assigned the new face to reuse the source device.

Figure 7:
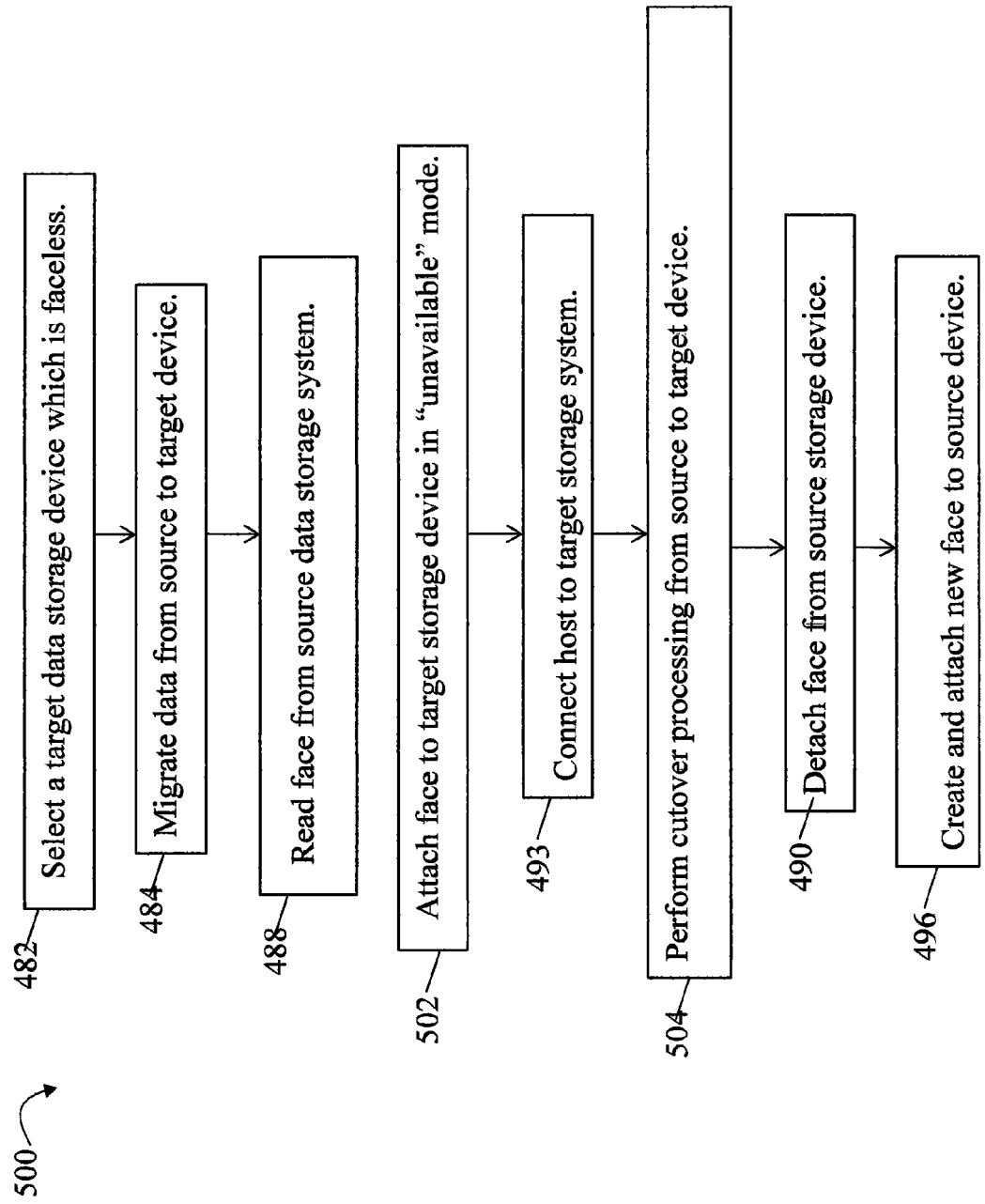

As another exemplary use case, the techniques herein may be used in connection with performing online data migration with reference now to FIG. 7. It should be noted that online migration described in connection with FIG. 7 may be characterized as a variation of the offline migration whereby the application is not stopped and then restarted. Rather, as described below in more detail, application writes may be suspended during a cutover to use the target device. Steps of FIG. 7 which are similar to those of FIG. 6D are denoted using the same element numbers. With reference to the flowchart 500 of FIG. 7, after performing steps 482, 484 and 488, step 502 is performed to attach the face (bound to the source device) to the target device in "unavailable mode" thereby indicating that the target device is currently unavailable for I/O processing although such target device and associated path may be discoverable in connection with non-I/O commands or operations. In an embodiment in accordance with the SCSI standard, the foregoing unavailable mode may more particularly be denoted as the "ALUA (asymmetric logical unit access) unavailable" mode. As will be appreciated by those skilled in the art, the ALUA SCSI standard includes other various states, modes and the like as may be used in an embodiment in accordance with techniques herein in connection with cutover processing such as related to discovery of new paths. In step 493, it should be noted that after connection of the host to the target data storage system, discovery processing may be performed to discover any paths to the new target device and others of the target data storage system. However, I/Os to the new target device are not yet allowed as indicated by the above-mentioned unavailable mode or state. At step 504, cutover processing is performed. Cutover processing may include steps performed to cutover application usage from the source to the target device. Step 504 cutover processing may include, for example, suspending new writes by the host/application to the source device, draining pending or "in-flight" I/Os to the source device thereby allowing such I/Os to complete, completing migration of any additionally written data to the source device, copying SCSI state information from the source to the target device, setting the path from the host to the target device to ALUA optimized or available (e.g., ready to accept I/Os), setting the path from the host to the target device to ALUA unavailable (e.g., will not accept I/Os), and resuming host writes previously suspended.

As another exemplary use case, the techniques herein may be used in connection with performing data replication.

In some instances, it may be desirable to copy data from one storage device to another. For example, if a host writes data to a first storage device, it may be desirable to copy that data to a second storage device provided in a different location (e.g. remotely located data storage system) so that if a disaster occurs that renders the first storage device inoperable, the host (or another host) may resume operation using the data of the second storage device. Such a capability is provided, for example, by a Remote Data Facility (RDF) product provided by EMC Corporation of Hopkinton, Mass., e.g., Symmetrix Remote Data Facility (SRDF). With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

There may be a number of different types of RDF transmission. Synchronous RDF mode allows synchronous data transfer where, after an initial data write from a host to a primary storage device, the data is transferred from the primary storage device to a secondary storage device using RDF. Receipt of the data is acknowledged by the secondary storage device to the primary storage device which then provides a write acknowledge back to the host for the initial data write. Thus, in synchronous RDF mode, the host does not receive a write acknowledge from the primary storage device until the RDF transfer to the secondary storage device has been completed and acknowledged by the secondary storage device. One product that allows for synchronous data transfers is produced by EMC Corporation of Hopkinton, Mass. and known as SRDF/S, which is further discussed elsewhere herein.

With synchronous RDF transmission, the latency of each of the write operations is increased by waiting for the acknowledgement of the RDF transfer. This may be more visible when there is a long distance between the primary storage device and the secondary or remote storage device; because of transmission delays, the time delay required for making the RDF transfer and then waiting for an acknowledgement back after the transfer is complete may be undesirable.

Another possibility for an RDF system is to have the host write data to the primary storage device and have the primary storage device copy data asynchronously to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate latency problems associated with synchronous data transfer modes, a difficulty still exists because there cannot be a guarantee of data consistency between the primary and secondary storage devices. If there are problems, such as a failure of the primary system, the secondary system may have stored therein out-of-order changes that make the data unusable.

A product by EMC Corporation known as SRDF/A in which data sets are transferred to the secondary array at defined intervals may also be utilized. Using SRDF/A, data to be copied from one storage array to another in chunks that are assigned sequence numbers based on when the data was written by the host. The data chunks are then separately transmitted according to the sequence number. Although the remote copy of the data may not be as current as the primary copy, SRDF/A allows replication of data over considerable distances in a manner that avoids the latency issues of synchronous transfers and has reduced bandwidth requirements. Moreover, data ordering problems associated with other types of remote data synchronous transfers are avoided. For further discussion of SRDF/A systems and techniques, see U.S. Pat. No. 7,000,086 to Meiri, et al., entitled "Virtual Ordered Writes," and U.S. Pat. No. 7,054,883 to Meiri, et al. entitled "Virtual Ordered Writes for Multiple Storage Devices," which are both incorporated herein by reference.

Any of the above-mentioned synchronous or asynchronous data replication/mirroring techniques using RDF may operate in accordance with active/passive operational behavior, meaning that reads and writes from a host occur on one primary storage volume (active), e.g., R1, while host writes and reads may be disabled at the secondary storage volume (passive), e.g., R2. The active R1 controls writes to the passive R2 in a process that may result in issues of currentness/correctness of the data at R2, as noted above. Further, as described in more detail elsewhere herein, an explicit failover operation is required to activate R2 in the case of failure of R1. In one embodiment as described in following paragraphs for active/passive RDF, R1 data storage devices may have attached faces and R2 data storage device may be faceless thereby making such R2 devices unavailable for host I/O operations including read operations.

Figure 8A:
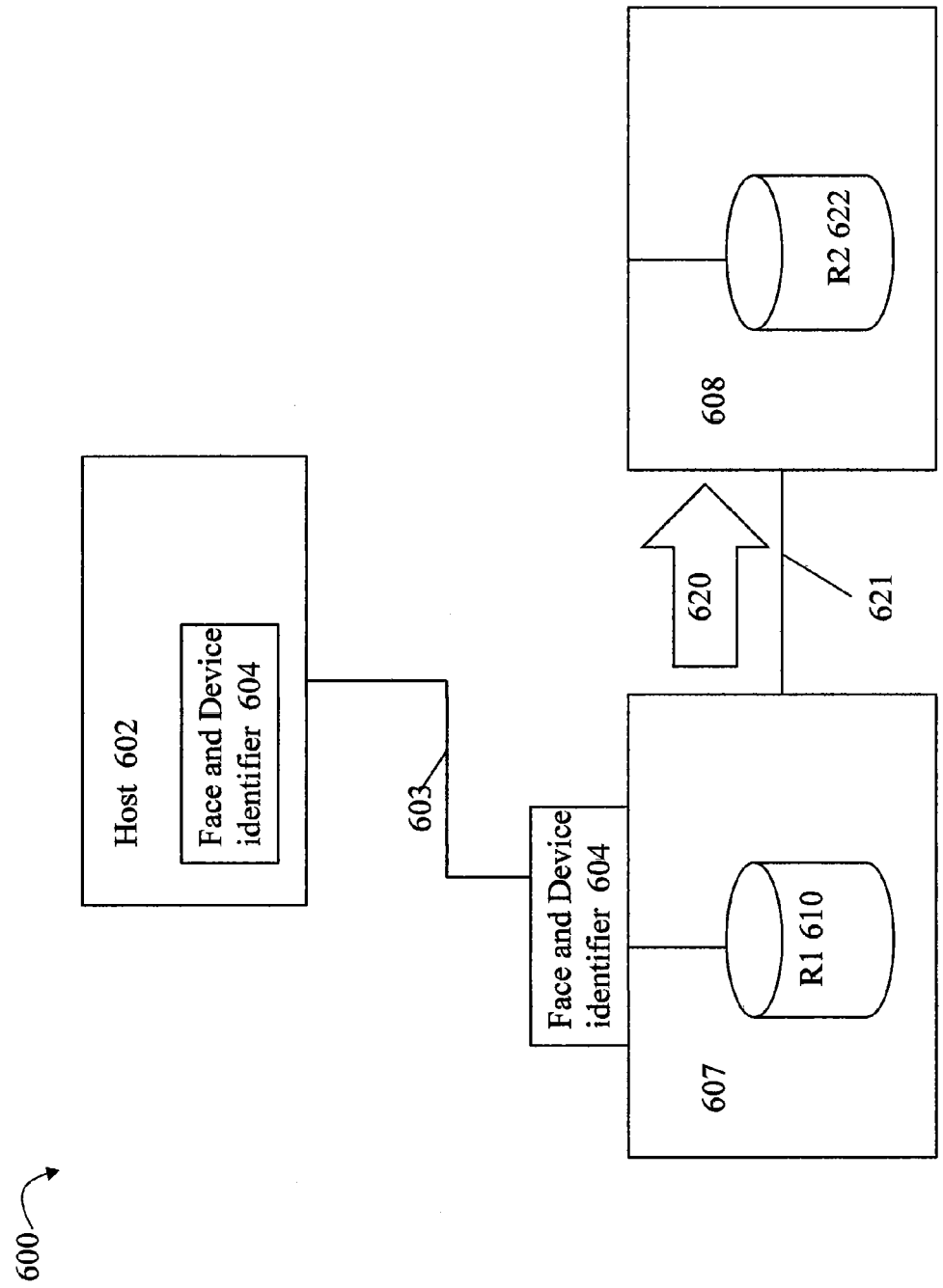

Referring to FIG. 8A, shown is an example illustrating an active/passive RDF arrangement as may be used in an embodiment in accordance with techniques herein. The example 600 includes a host 602 assigned a face and device identifier 604, a local or primary data storage system 607 including local storage device 610 (also serving as the primary R1 device for the RDF pairing), and a remote data storage system 608 including remote storage device 622 (also serving as the secondary R2 device for the R1-R2 RDF pairing). Face and device identifier 604 may have been created and assigned to an application executing on host 602. The face and device identifier 604 may be attached to R1 610 thereby allowing the host to perform I/Os to the R1 device 610. In accordance with the use of RDF, any writes to the R1 device 610 of the defined RDF R1-R2 pairing are automatically propagated to the R2 device 622 of the defined pairing. Such automated propagation or replication is represented by 620 over connection or link 621. The storage device 610, as a local R1 storage device, is coupled to the remote R2 storage device 622 via the RDF link 621. The remote storage device 622 may be the same type of storage device as the storage device 610, and have similar components as described with respect to the storage device 610, and/or may be a different type of storage device. The local storage device 610 and the remote storage device 622 may operate as an RDF product for providing backup and/or mirrored copies of data, as further discussed elsewhere herein.

Providing an RDF mapping between R1 610 and R2 622 involves setting up device R2 622 on the remote storage system 608 to function as a remote mirror for device R1 610 on data storage system 607. Host 602 may read from and write data to device 610. The RDF mapping causes modified data to be transferred automatically from the device R1 610 to R2 device 622 using one or more RAs on systems 607 and 608 and the RDF link 621. In steady state operation, the R2 device 622 contains data that is identical to the data of R1 device 610. As illustrated, the device 622 that is accessed by the host 22 may be referred to as the "R1 volume or device" (or just "R1") while the corresponding mirrored device 622 on the remote system 608 that contains a copy of the data on the R1 volume is called the "R2 volume or device" (or just "R2"). Thus, the host reads from and writes data to R1, and RDF handles automatic copying and updating of the data from R1 610 to R2 622.

The data storage systems 607 and 608 may be as described, for example, in connection with FIG. 1, and may include one or more Remote Data Facility (RDF) adapter units (RAs 40 as in FIG. 1). An RDF product, such as produced by EMC Corporation of Hopkinton, Mass., may be used to copy data from one storage device to another. The RAs of the system 607 are coupled to RDF link 621 and used to transfer data between the systems 607 and 608. For yet further discussion of RDF and the use thereof in data communication and storage techniques, see U.S. Pat. No. 5,742,792 to Yanai, et al., which is incorporated herein by reference.

In an embodiment, the system described herein in FIG. 8A with active/passive replication may be used in connection with SRDF synchronous (SRDF/S) transfers. For a SRDF/S transfer, data is written from host 602 to R1 610 whereby such written data is subsequently transferred from the local storage device 24 to the remote storage device 25 using RDF. Receipt by the remote system 608 is then acknowledged to the local system 607 which then provides an acknowledge back to host 602. In other embodiments, the system described herein in the example 600 may also be used in connection with other modes of data transfer, including, or in combination with, asynchronous (SRDF/A) transfers and/or other similar data transfer systems and devices.

Figure 8B:
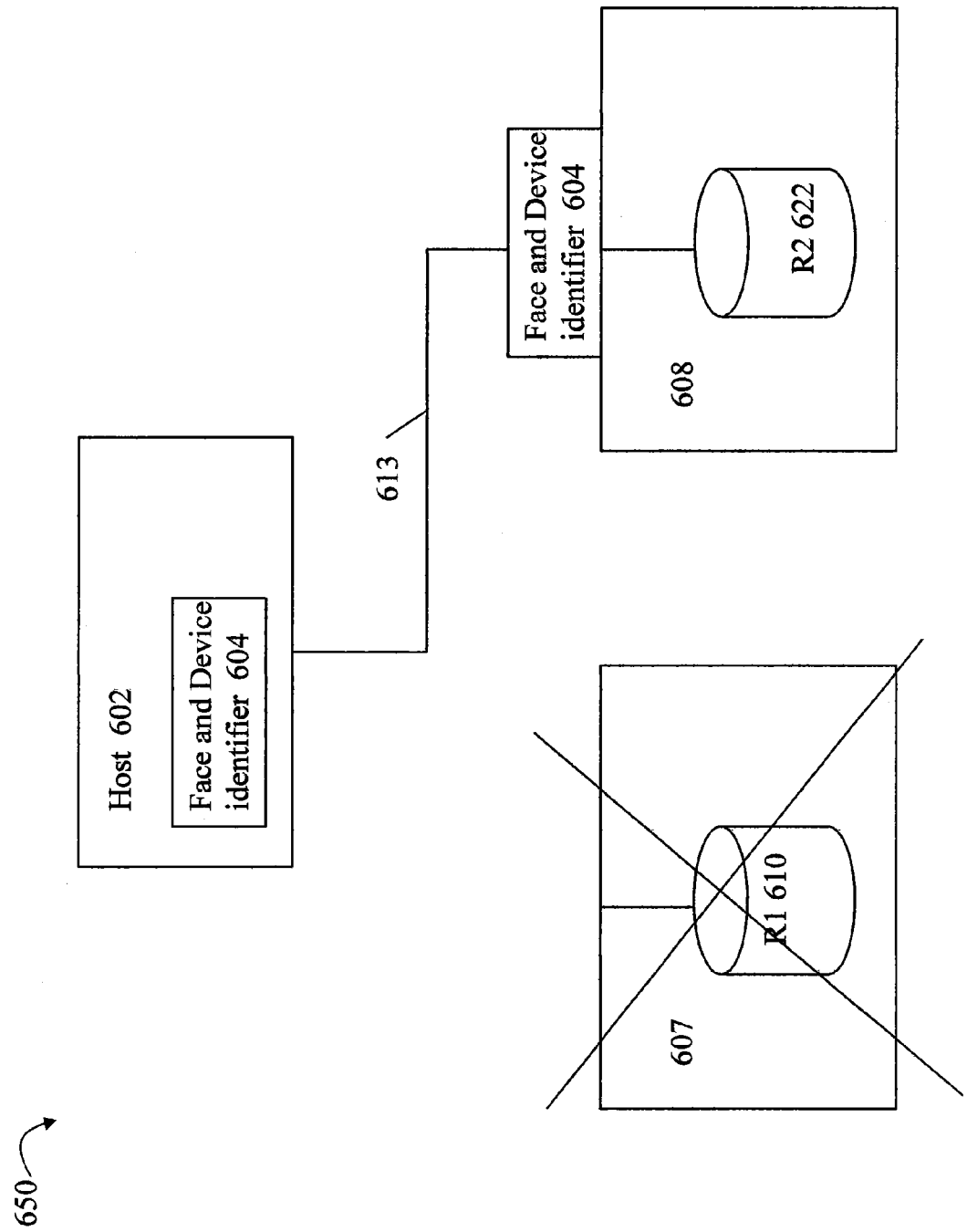

With an active/passive SRDF arrangement such as illustrated in FIG. 8B, a disaster or failure may occur with respect to R1 610 and/or the data storage system 607 whereby processing is performed to failover and use the copy of data on R2 622. In connection with failover processing (assuming the host 602 is operational and not the subject of failure), the R2 device 622 may be attached to the face and device identifier 604 thereby now making the device 622 accessible to the host 602 over path 613. By attaching face and device identifier 604 to device 622, the host 602 and application executing thereon may continue processing using the same face 604 as previously attached to the failed device 610. As a further variation to that as illustrated in FIG. 8B with failover processing, an embodiment may alternatively have another host different from host 602 configured to use the face and device identifier 604 when attached to the R2 device 622.

At a later point in time if data storage system 607 and device 610 are once again operational, processing may be performed in accordance with techniques herein to resume operation in accordance with that as illustrated in FIG. 8A. As part of this restoration of the systems to that as illustrated in FIG. 8A, the face and device identifier 604 may be detached from R2 622 and attached once again to R1 device 610.

As a further variation to the above-mentioned example, following failover processing causing the system to be configured as represented in FIG. 8B, the system 607, device 610 and link 621 may again become operational. However, in this variation, the example of FIG. 8B may be further modified to become a system operating as an active/active SRDF system as illustrated in FIG. 8C.

Figure 8C:
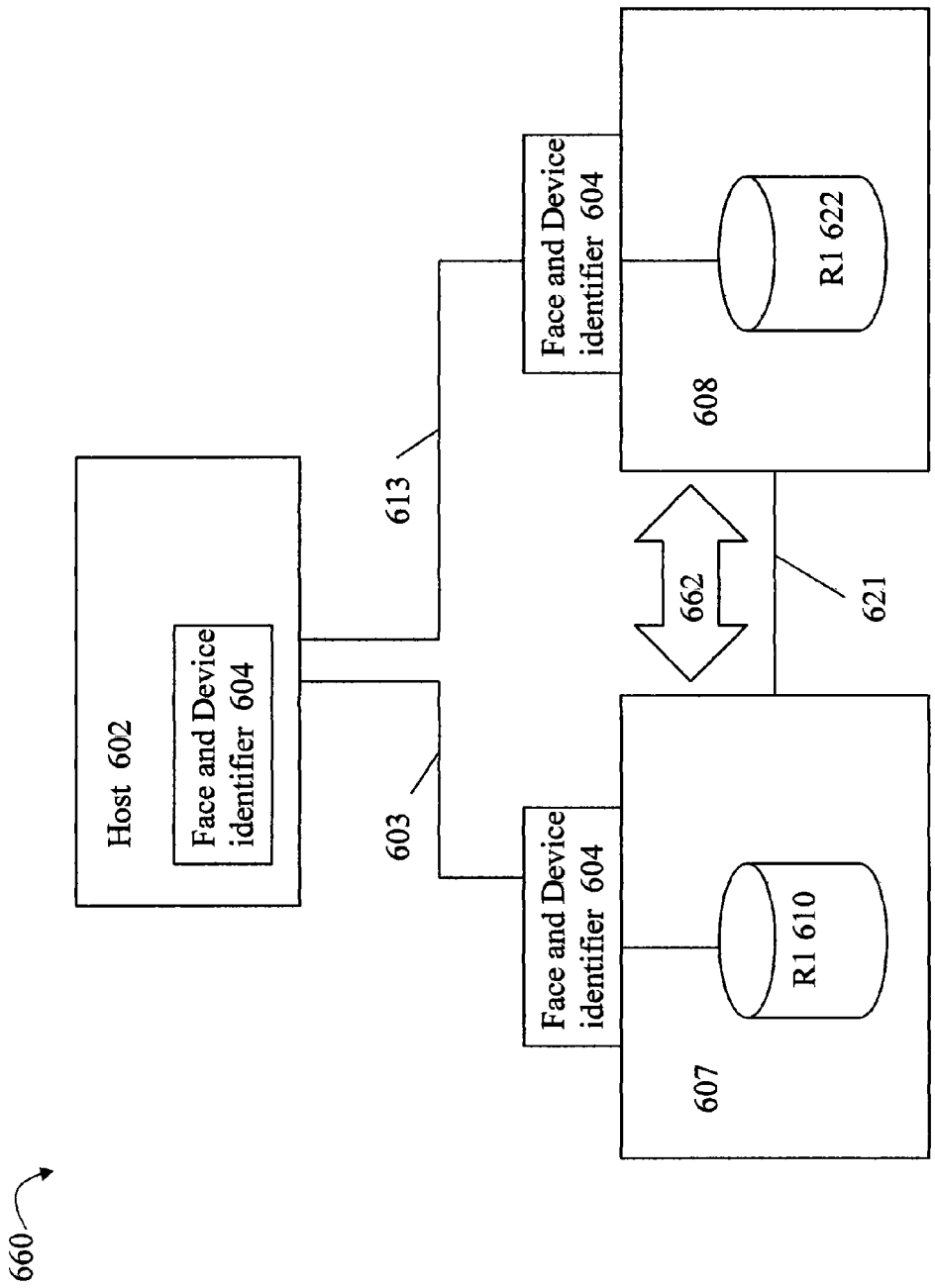

In an active/active SRDF system as illustrated in FIG. 8C, the host is allowed to perform I/Os to both devices 610 and 622 having a same face and device identifier 604. In this manner, elements 603 and 613 appear from to the host 602 as two paths to the same device having face and device identifier 604 whereby the host 602 may read and write over both paths 603 and 613. If the host writes over path 603 to device 610 using the face and device identifier 604, such writes are automatically propagated using RDF techniques over link 621 to device 622. In a similar manner, if the host writes over path 613 to device 622 using the face and device identifier 604, such writes are automatically propagated using RDF techniques over link 621 to device 610. Thus, the devices 610 and 622 may defined as a logical pairing of active/active RDF devices whereby RDF, RAs of systems 607, 608, and link 621 is used to facilitate automated replication of writes to each of the devices 610, 622 to the other of the devices 610, 622. In this manner, both devices 610 and 622 may function as R1 or primary devices to which the host 602 can read from and write to.

In an embodiment, each of the storage devices 610, 622 may be treated like an active storage device (e.g., an R1 volume) by the host 602 whereby the same face and device identifier 604 may be attached to both 610 and 622 as illustrated. In this manner, the host 602 may treat the device 610 as a local storage device (R1) and the device 622 as a remote storage device (R2) when issuing I/Os to device 610 over path 603. In a similar manner, the host 602 may treat the device 622 as a local storage device (R1) and the device 610 as a remote storage device (R2) when issuing I/Os to device 622 over path 613. In this manner, the host 602 may be provided with automatic failover in the case of failure of either 610, 622, or the connection 621 therebetween. In the case of any one or more of the foregoing failures, the host 602 may continue to work with the non-failing device with no interruption in service. From the perspective of the host 602, failure of one of 610 or 622 may be logically viewed as a failure of a single path to the same device having the face and device identifier 604.

In the event that the link 621 fails and the host 602 is able to communicate with 610 over 603 and 622 over 613, the host 602 may select one of the devices 610, 622 that it will continue to use for issuing I/Os. The winning device selected by the host for continued use may remain attached to the face and device identifier 604. The losing device not selected by the host for continued use may be detached from the face and device identifier 604 thereby making the losing device faceless and inaccessible to the host for I/O operations. It should be noted that an embodiment may perform the above-mentioned detach operation internally and automatically on the data storage system.

An embodiment may use any one or more suitable techniques in connection with deciding which of the devices 610, 622 the host will continue to use upon failure of the link 621 used in connection with facilitating data replication between the devices 610, 622. Active/active remote mirroring and various failure policies and techniques that may be used in connection therewith are described in more detail, for example, in U.S. patent application Ser. No. 12/080,027, filed Mar. 31, 2008, ACTIVE/ACTIVE REMOTE MIRRORING, which is incorporated by reference herein, and U.S. patent application Ser. No. 12/930,121, filed Dec. 29, 2010, WITNESS FACILITY FOR DISTRIBUTED STORAGE SYSTEM, which is incorporated by reference herein.

In connection with the techniques herein, when an active/passive R1/R2 RDF replication pair (e.g., as in FIG. 8A) becomes an active/active R1/R1 pair (e.g., as in FIG. 8C), the R2 device 622 inherits the face (and also the SCSI state information) of the R1 device 610 thereby causing devices 610, 622 to appear to the host as the same device having the face and device identifier 604. In one embodiment where device 610, 622 are configured as an active/passive replication at a first point in time (e.g., as in FIG. 8A), redefining or reconfiguring the devices 610, 622 at a later point in time as an active/active replication pair of devices (e.g., to be as in FIG. 8C) may automatically cause an attachment of face and device identifier 604 to the R2 device 622.

Figure 9:
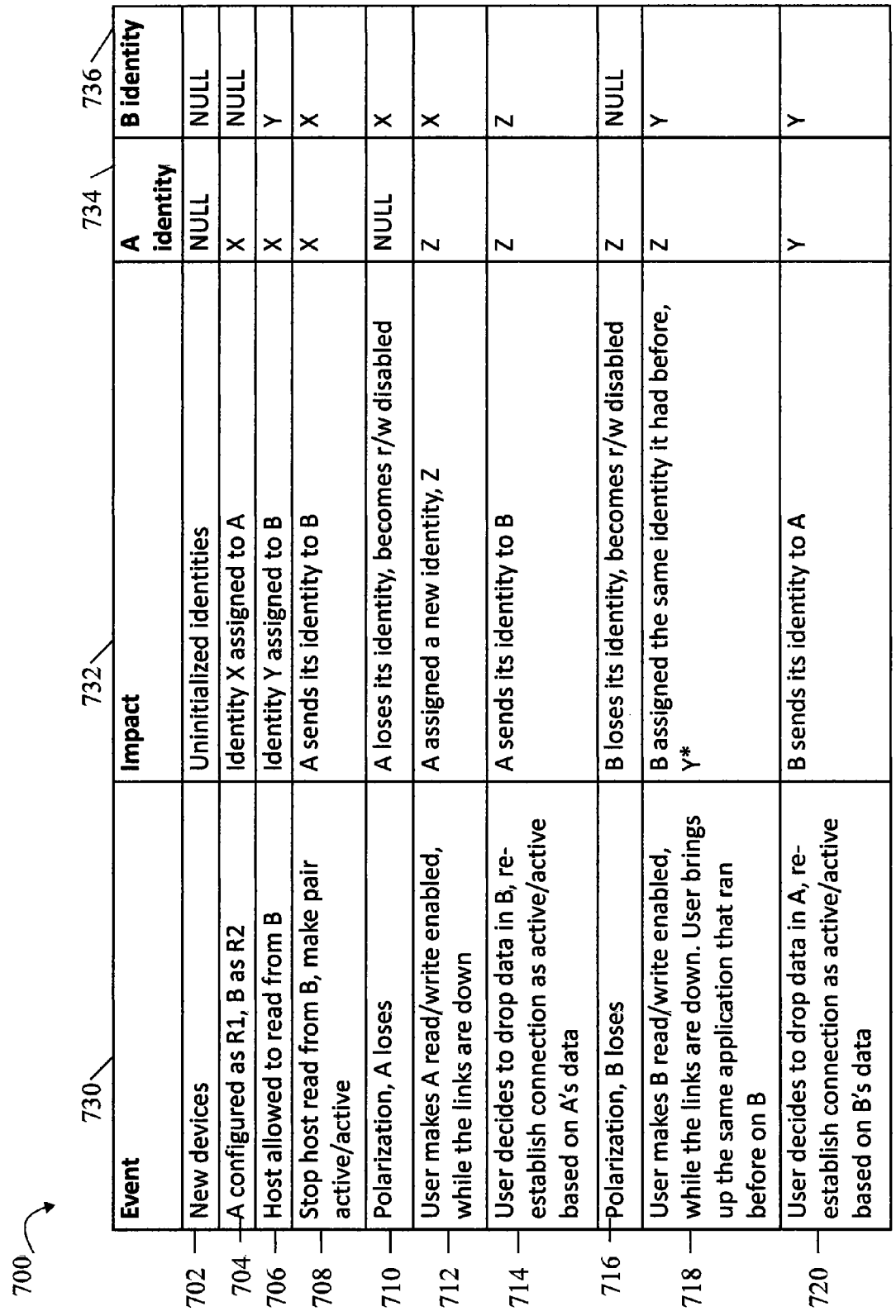

With reference now to FIG. 9, shown is a sequence of events that will be further used to illustrate exemplary uses of the techniques herein. FIG. 9 includes a table 700 with three columns denoting events 730, impact 732, identity A 734 and identity B 736. Each row of the table 700 may be characterized as describing a current state of the system in a defined sequence whereby 702 denotes a first state, 704 a second state, and so on. For each state 702-720, an event 730 such as related to a configuration change may have an impact 732 on identities of a pair of storage devices A, B whereby A may be a storage device of a first data storage system and B may be a storage device of a second data storage system.

Figure 10B:
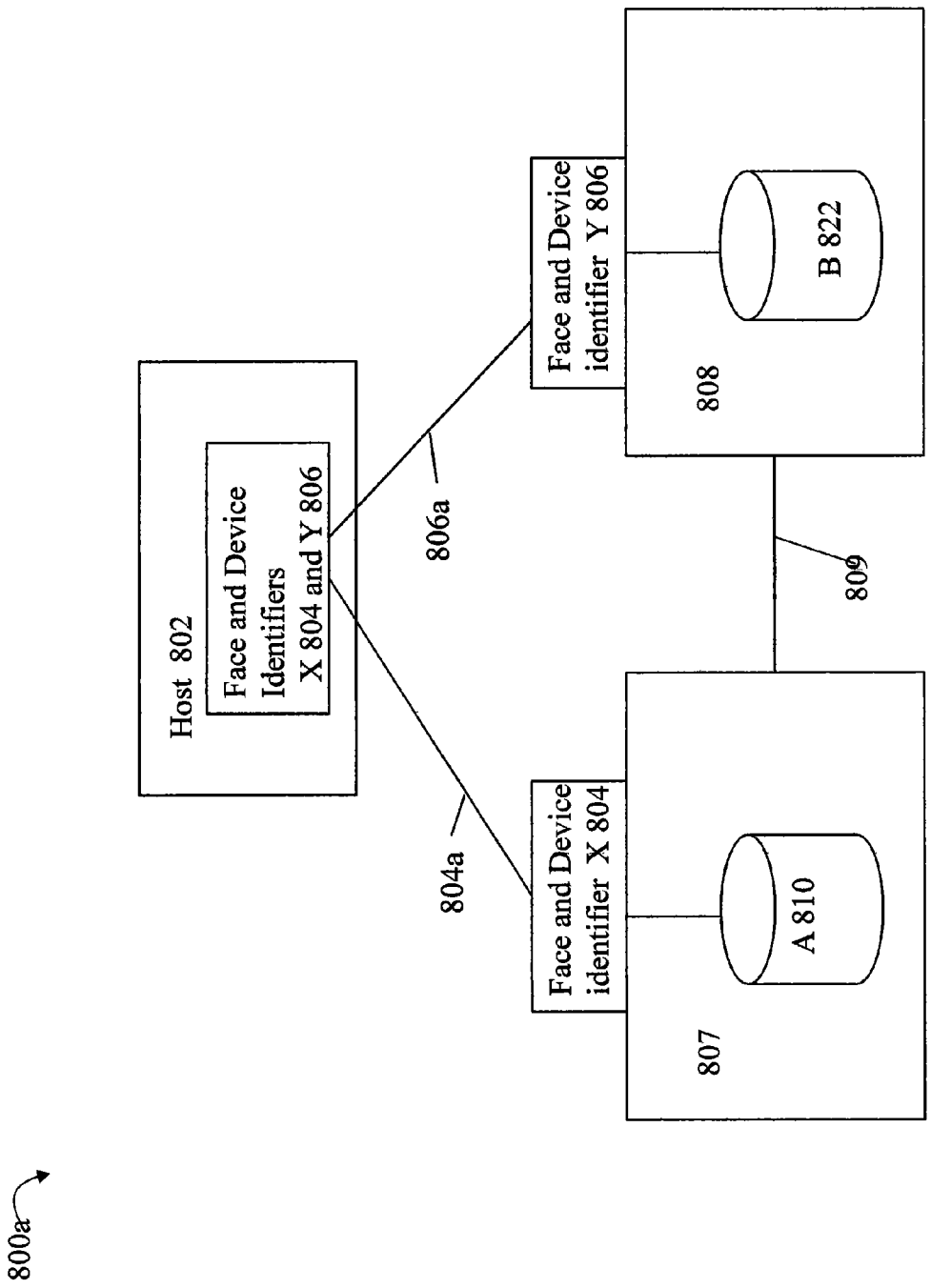
Figure 10C:
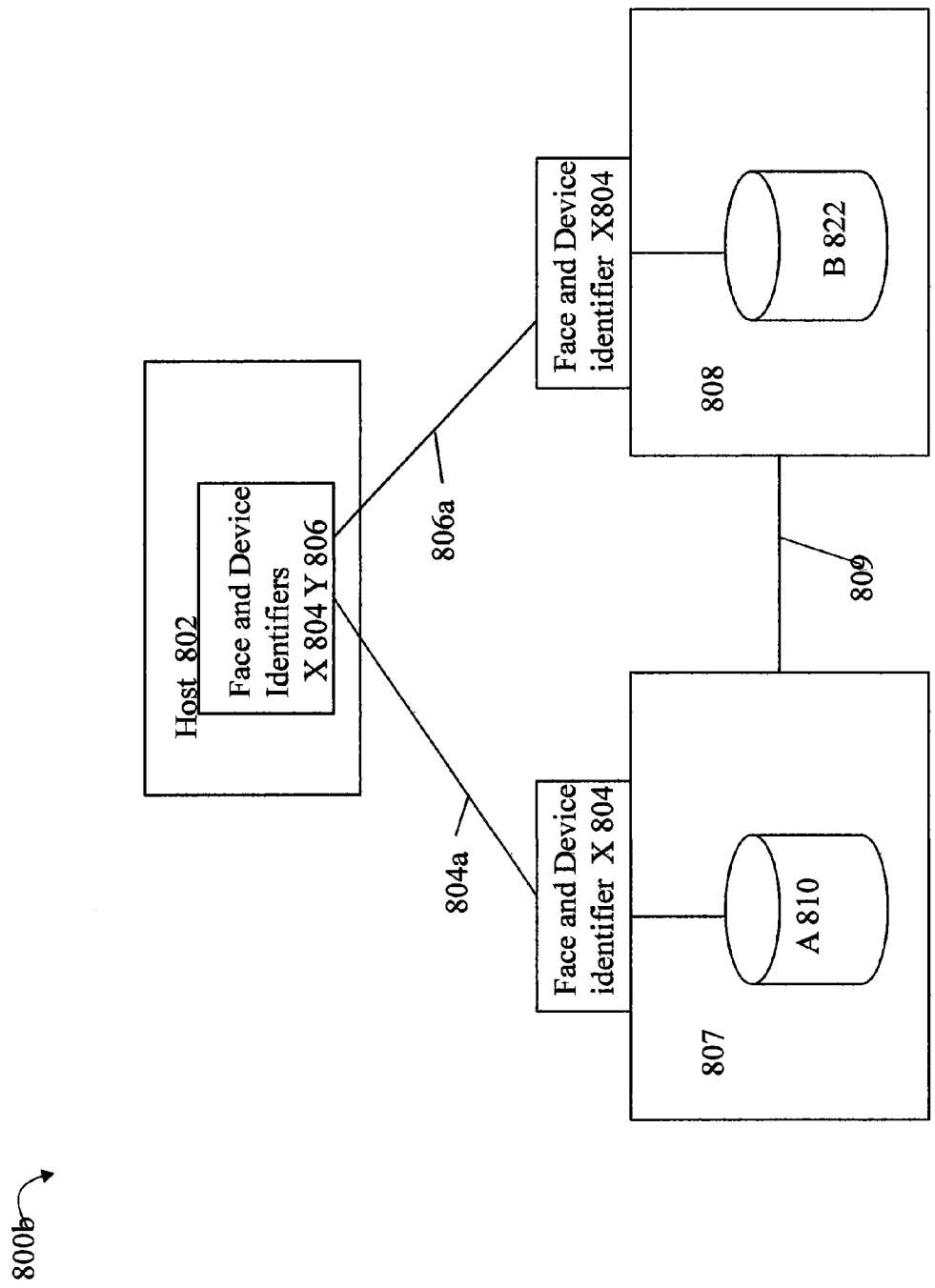
Figure 10E:
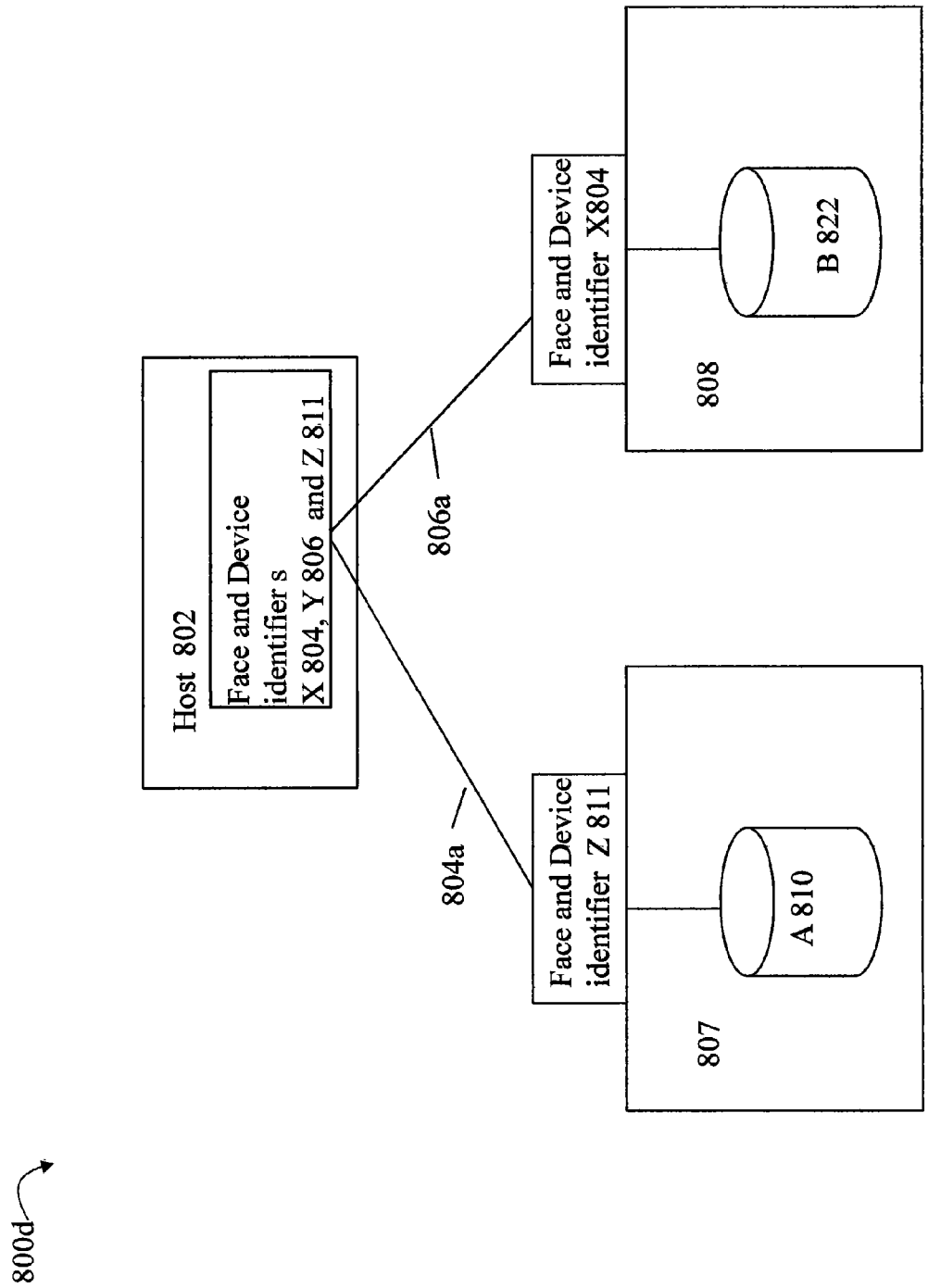

With reference to FIG. 9 and also FIG. 10A, row 702 specifies an initial or first state as illustrated in FIG. 10A whereby device A 810 of data storage system 807 and device B 822 of data storage system 808 are new devices which are faceless having uninitialized (NULL) identities. FIG. 10A also includes a host 802 which currently has no paths to A 810 or B 822. As indicated by row 704 of FIG. 9, devices A 610 and B 622 may be configured as an active/passive RDF replication pair whereby an identity X is assigned to A. In connection with techniques herein, the identity X may denote a face X 804 which is attached to device A 810 as illustrated in FIG. 10B. In FIG. 10B, the face X 804 may be assigned to the host 802 and the host 802 may issue I/O operations to device A 810 over path 804a. Element 809 may represent the link used in connection with the automatically replicating data written to device 810 to device 822. With reference to 706 of FIG. 9, the host 802 may then be allowed to read from device B 822 and thus a new face Y 806 may be created and attached to device 822. It should be noted that this new face Y 806 may also be assigned to the host 802 and the host 802 may issue read operations to device B 822 over path 806a. With reference to 708, the host is stopped from reading from device B 822 and the device pair A 810/B 822 are configured as an active/active RDF replication pair. As part of configuring the system in accordance with transitioning from 706 to 708, the face and device identifier Y 806 is detached from device B 822 and the device pair A 810/B 822 may then be configured as an active/active RDF replication pair. As a result of such active/active configuration, the face and device identifier X 804 may be attached to device B 822.

Figure 10F:
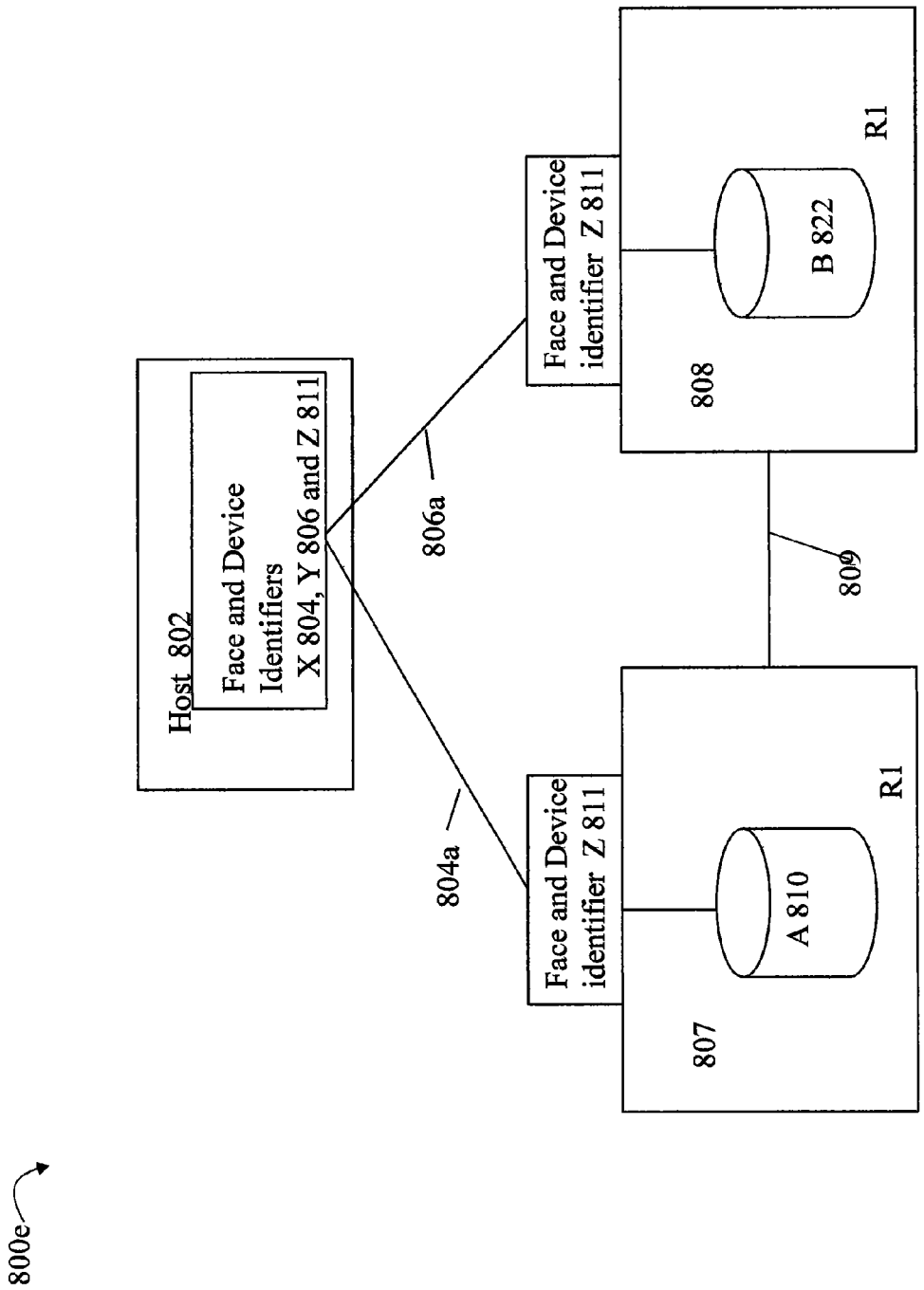

With reference to 710 of FIG. 9, the link 809 that facilitates data replication may go down and the host 802 may still be able to communicate with both device 810 and 822. This state may also be referred to as polarization whereby the host selects one of the devices 810 and 822 to continue to issue I/O operations to. In this example now with reference to FIG. 10D, device B 822 is so selected as the winner thereby causing device A 810 to lose its current identity as represented by 804. While the link 809 between the systems 807 and 808 is down and with reference to 712 of FIG. 9, the device A 810 is given a new identity Z by attaching face and device identifier Z 811 to device A 810. The host 802 is assigned face and device identifiers X 804 and Z 811 at the current time. With reference to 714 of FIG. 9, it is now decided to drop the data in device B 822 since the connection 809 between the systems 807, 808 has been repaired to an operational state for data replication purposes. In this case as represented in FIG. 10F, the device pair A 810/B 822 is once again configured as an active/active RDF replication pair using the identity Z as represented by face and device identifier Z 811.

Figure 10G:
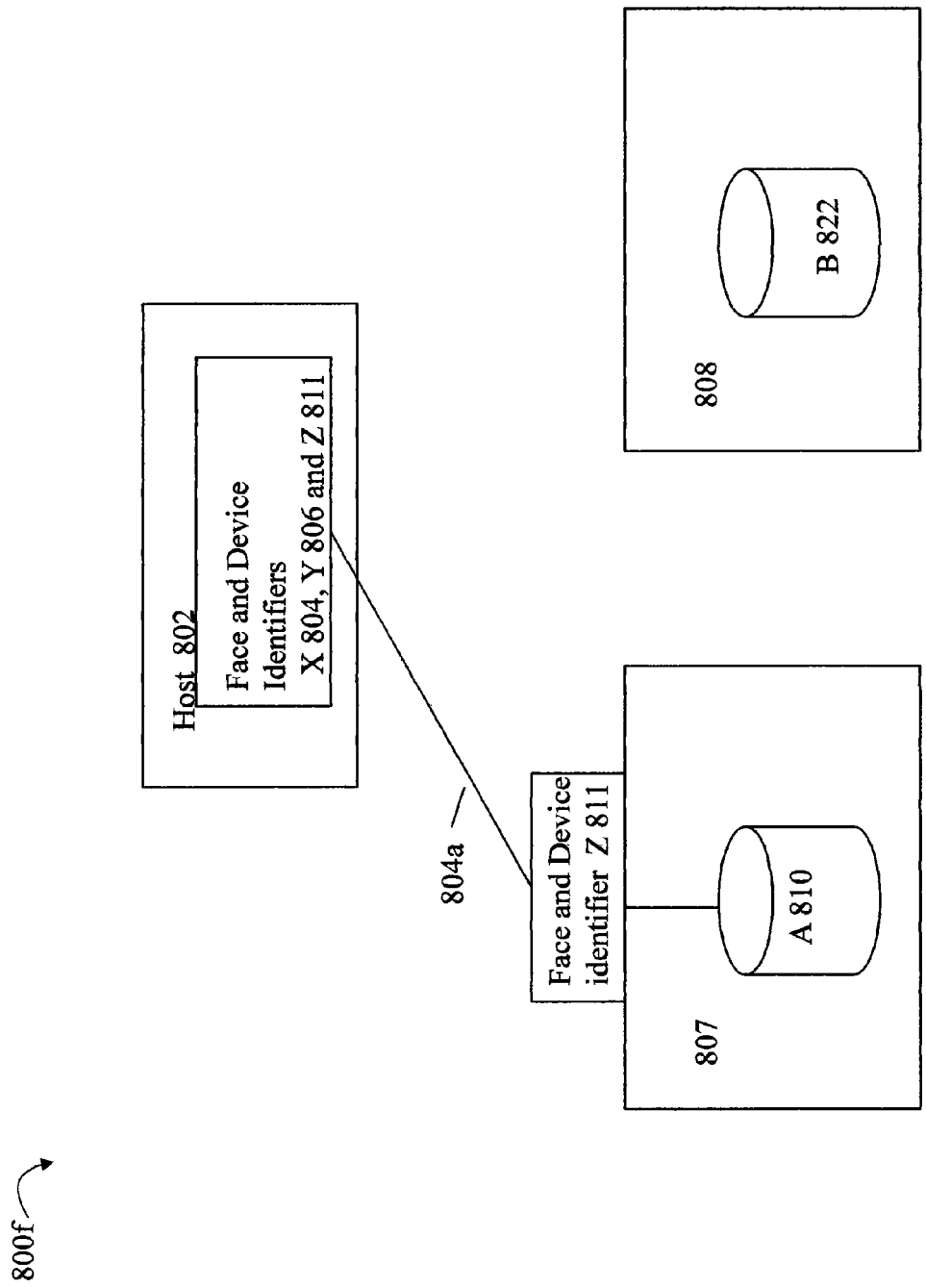
Figure 10H:
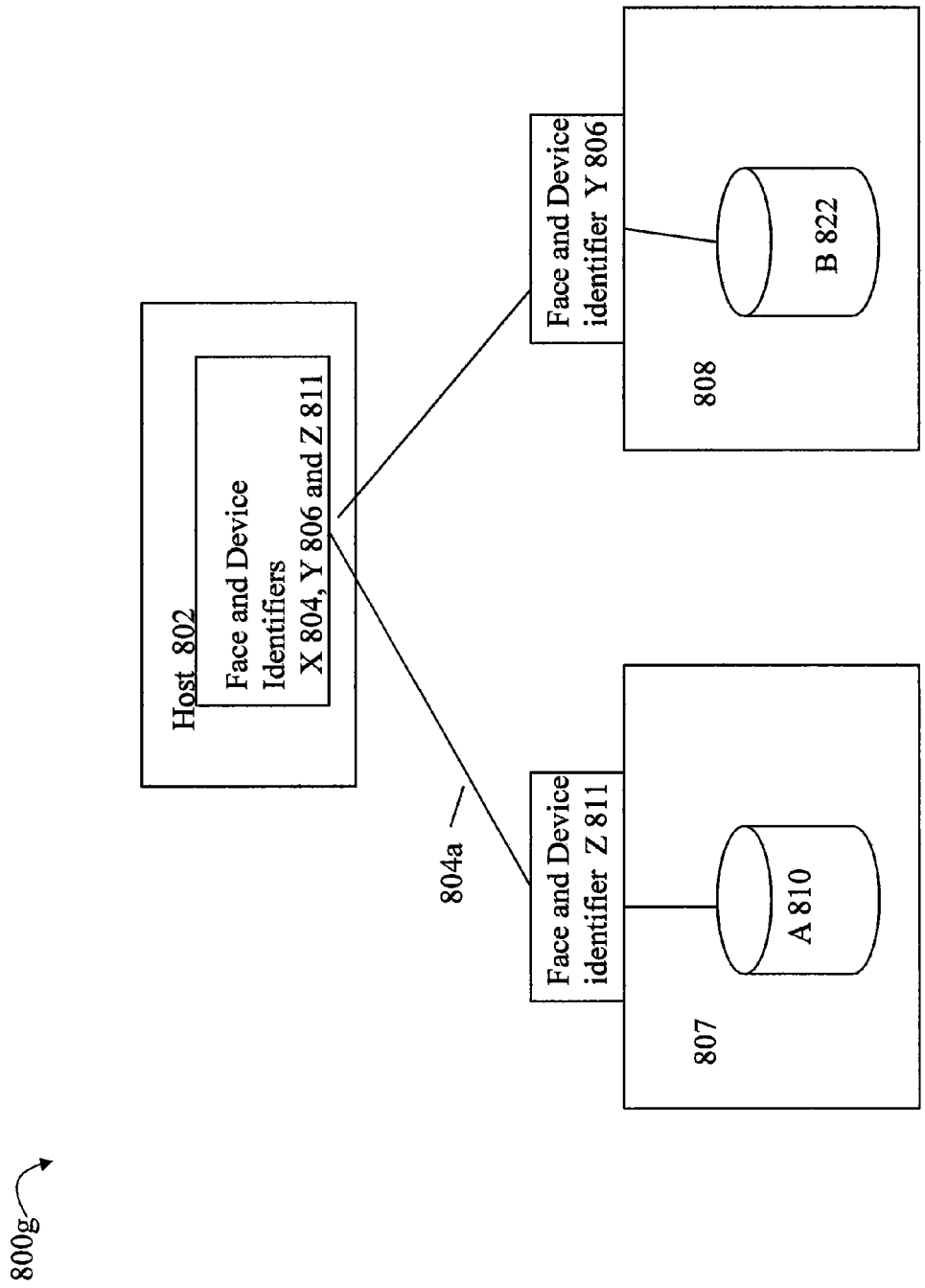
Figure 10I:
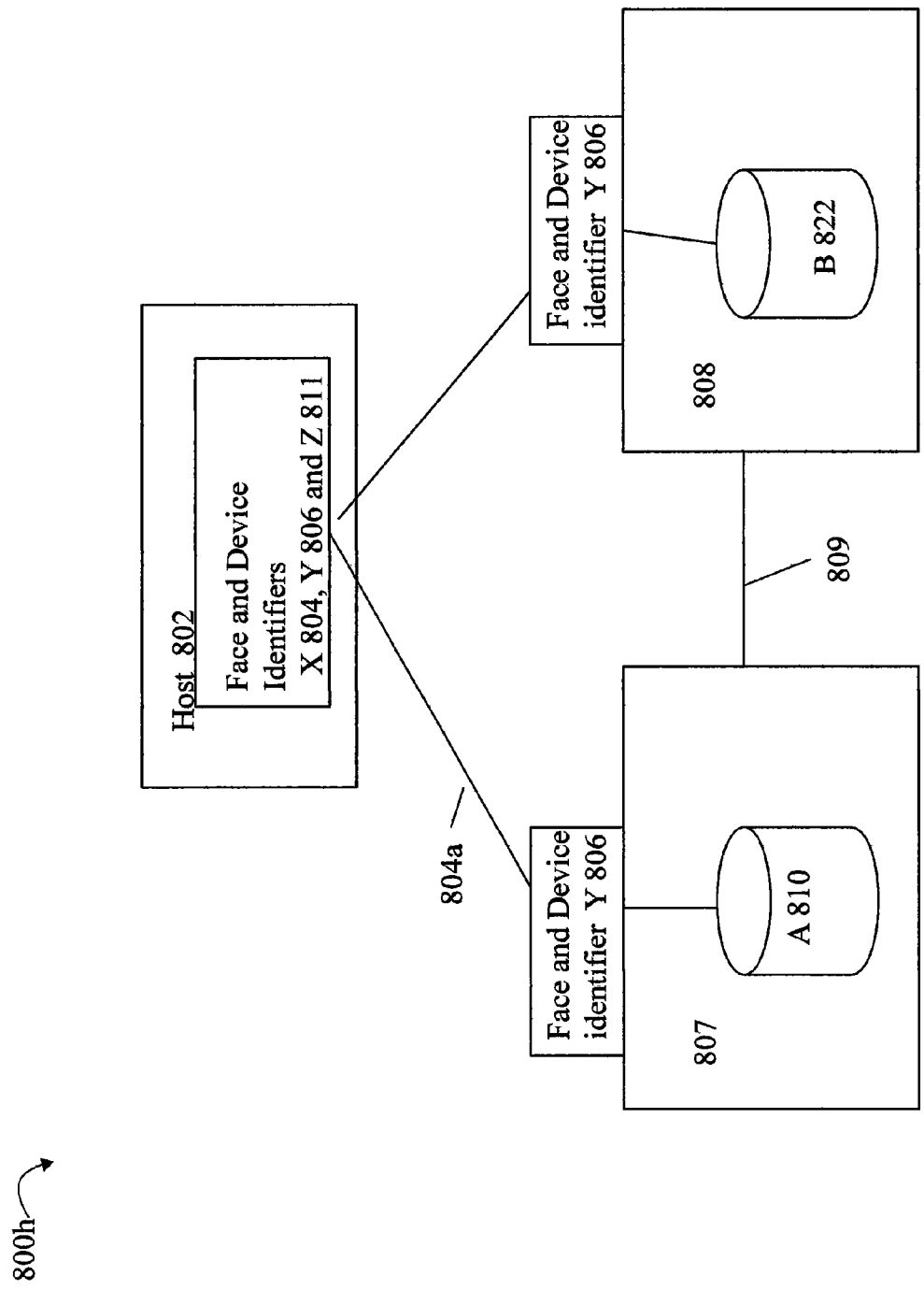

With reference to 716 of FIG. 9 and FIG. 10G, the link 809 again fails and the host selects to continue using device A 810 and not device B 822 thereby causing B to lose its identity Z represented by 811. With reference to 718 of FIG. 9 and FIG. 10H, device B 822 is made read/write enabled to the host 802 whereby the same application that ran on the host 802 previously (as in connection with 706) using face and identifier Y is now restarted. In this manner, the face and identifier Y 806 may be reattached to device B 822 as illustrated in FIG. 10H. With reference to 720 of FIG. 9 and FIG. 10I, the data in device A 810 may be discarded when the link 809 between the system 807, 808 is again operational for replication. The device pair A 810/B 822 is configured as an active/active RDF replication pair based on device B 822's data. As a result of this active/active configuration, the face and identity Y 806 is attached to device 822.

The foregoing illustrates exemplary uses of the techniques herein in connection with the changing data uses and dynamic bindings of device identifiers.

Figure 11A:
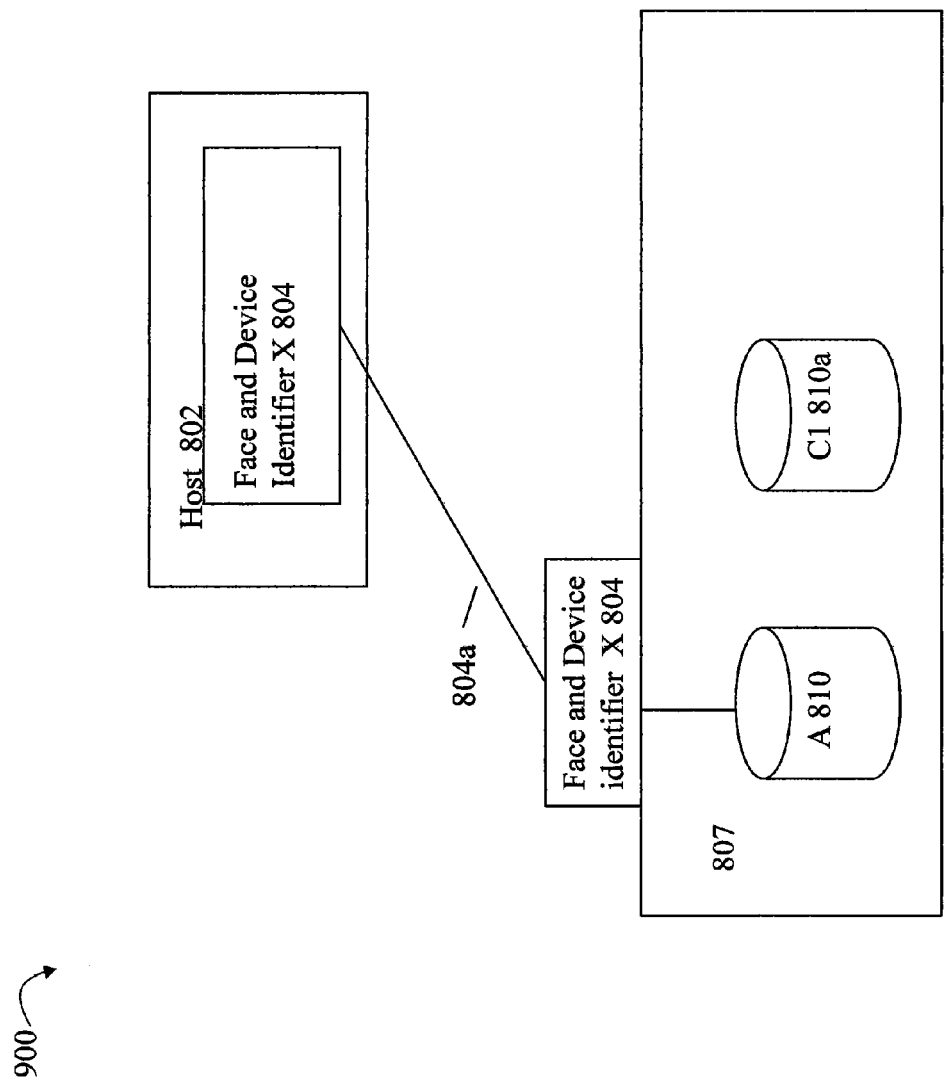

As another example with reference to FIGS. 11A and 11B, the techniques herein may be used in connection with testing. Elements of FIGS. 11A and 11B which are the same as in connection with above-mentioned figures have the same reference numbers. Device A 810 of the data storage system 807 may represent a production copy of data currently in use. Processing may be performed to make a copy of device 810 (e.g., such as a clone) which is denoted as device C1 810a. Currently, an application on host 802 is using face and device identifier 804 attached to device A 810 to thereby use the copy of the data as in 810. A user may want to test the application on host 802 using the copy C1 810a of the data. Using the techniques herein, the face and identifier 804 may be detached from device A 810 and then attached to device C1 810a as in FIG. 11B. The application on the host 802 may then run using the data on the device C1 810a thereby having the host configuration remain the same.

Figure 12A:
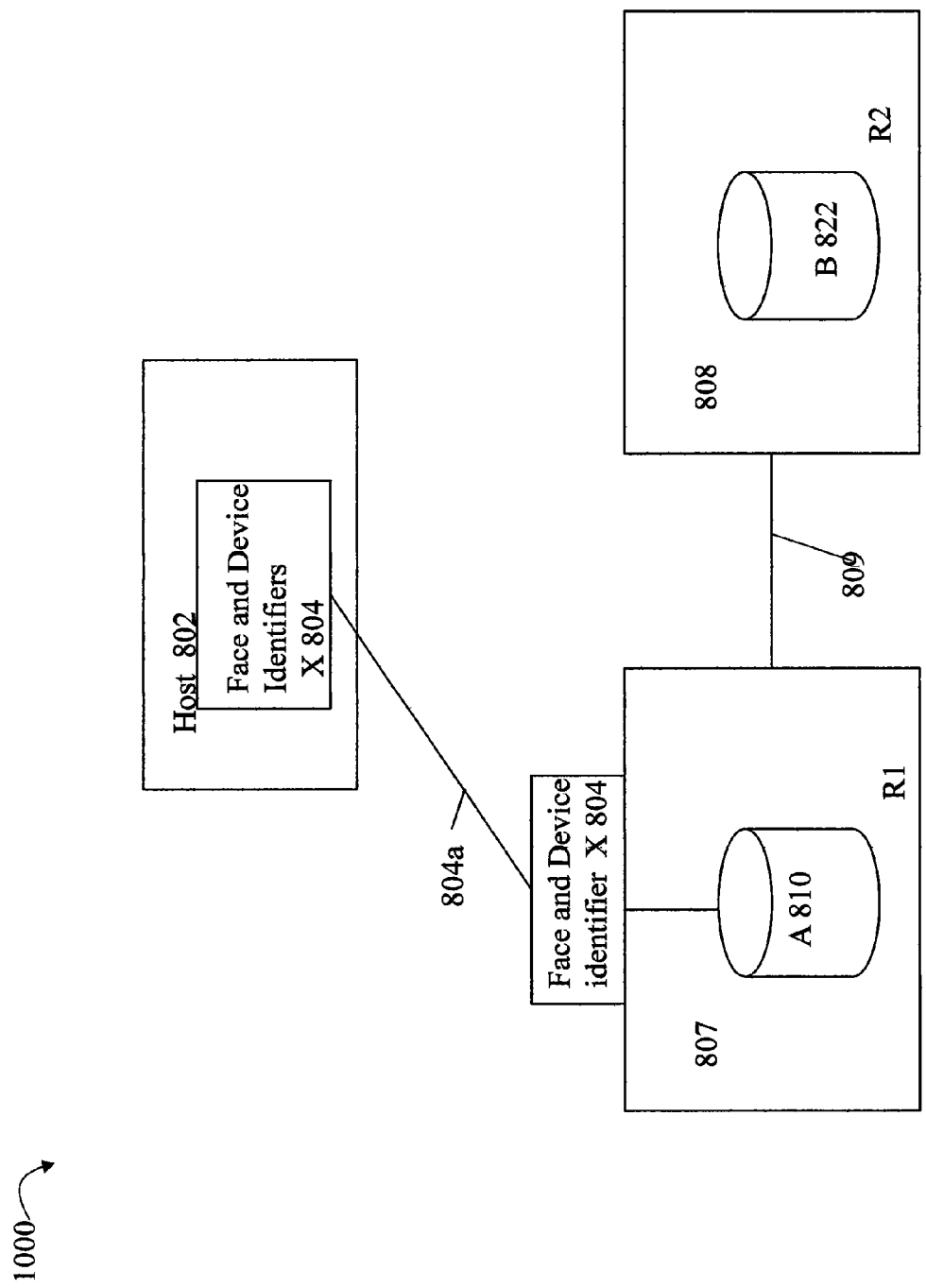
Figure 12B:
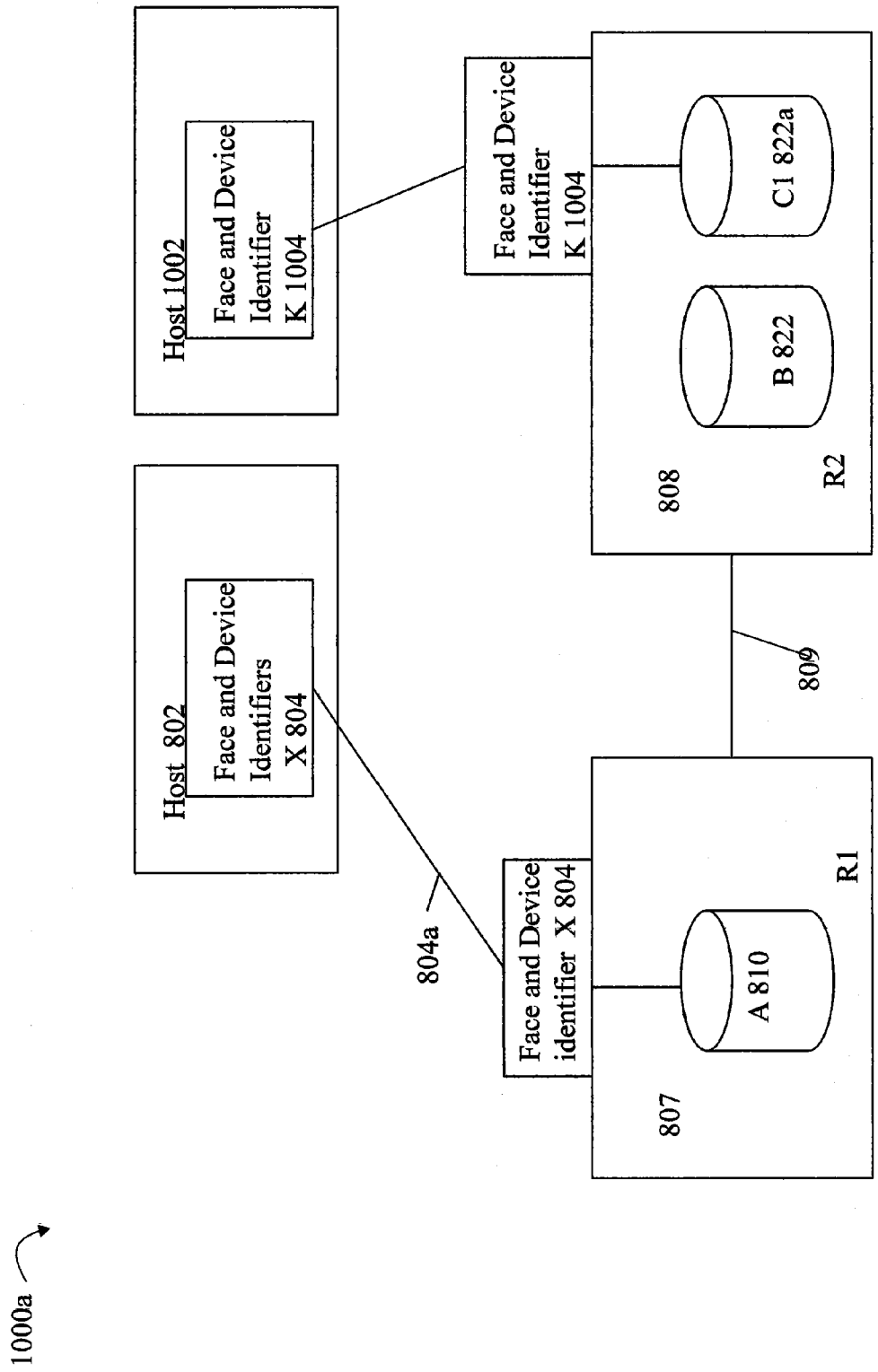

As yet another example, the techniques herein may be used in connection with SRDF (data replication) disaster recovery (DR) testing as illustrated in connection with FIGS. 12A and 12B. Elements of FIGS. 12A and 11B which are the same as in connection with above-mentioned figures have the same reference numbers. In FIG. 12A, the system may be configured to have an active/passive RDF replication where the R1 or active device to which the host 802 issues I/Os is device A 810 and device B 822 is the R2 or passive device which is faceless in this example. The face and device identifier X 804 is attached to device A 810 which is the production data copy. Data storage system 807 and host 802 may be within the same first disaster recovery zone and data storage system 808 may be remotely located in a second different disaster recovery zone. Such disaster recovery zones may be specified and located a defined geographical physical distance from one another so that upon a disaster occurring in the first such zone rendering host 802 and 807 unavailable, the system 808 may not be affected so that operations may continue using a different host and the copy of the data in device B 822. A customer may want to test the system to ensure that the copy of the data on device B 822 with another host is able to successfully perform operations as would be the case upon the occurrence of a disaster or failure of host 802 and system 804. As a first option, the customer may suspend replication processing and perform such testing using the data copy on device B 822. However, this may be undesirable in that the customer may not want to suspend the data replication processing in order to perform the disaster recovery testing using the R2 device B 822. In connection with techniques herein and with reference to FIG. 12B, a second host 1002 may be assigned face and device identifier K 1004. A copy or clone of the data on the R2 device B 822 may be made which is denoted as C1 822a. For disaster recovery testing, the face and device identifier 1004 may be attached to the device C1 822a and the testing may therefore be performed while the active/passive SRDF replication continues using devices 810, 822. Upon the occurrence of a real disaster causing the host 802 and system 807 to be unavailable (e.g., where failover processing is performed), the host 1002 may operate using the R2 device B 822 rather than the device C1 822a whereby the face and device identifier K may be attached to the R2 device B 822 rather than the copy C1 822a as when testing. In this manner, the configuration of host 1002 remains the same in connection with disaster recovery testing and in connection with running the host 1002 upon the occurrence of a real disaster as in failover processing.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing dynamic binding of device identifiers to data storage devices comprising:
    receiving a first device identifier that is assigned to an application on a host at a first point in time without having the first device identifier bound to any data storage device, said application having its data stored on a data storage system, said first device identifier being a unique detachable device identifier dynamically bound to different data storage devices at different points in time in accordance with data storage devices used by the application, wherein said first identifier is assigned to the application at the first point in time and is not bound to any data storage device at the first point in time thereby not identifying any data storage device;
    attaching the first device identifier to a first data storage device of the data storage system, said first data storage device including a first set of data used by the application, wherein said attaching the first device identifier to the first data storage device is performed subsequent to the first point in time and includes updating information on the data storage system to associate the first device identifier with a first data storage system internal identifier used locally by the data storage system to identify the first data storage device and makes the first data storage device available for data operations from the application;
    detaching the first device identifier from the first data storage device thereby making the first data storage device unavailable for data operations from the application; and
    attaching the first device identifier to a second data storage device that is different from the first data storage device, said second data storage device including a second set of data used by the application at a second point in time, said attaching the first device identifier to the second data storage device making the second data storage device available for data operations from the application.

2. The method of claim 1, wherein the first device identifier includes any one or more of a world wide name uniquely identifying a data storage device of the data storage system and a label written to a predetermined location on a data storage device to which the first device identifier is attached.

3. The method of claim 1, wherein the first device identifier is assigned to the application for a lifetime of the application and wherein performing said detaching of the first device identifier from the first data storage device and said attaching the first device identifier to the second data storage device results in the application using the second set of data rather than the first set of data without rebooting the host and without reconfiguring the application.

4. The method of claim 1, wherein the first device identifier is one of a plurality of device identifiers assigned to the first application prior to connecting the host to the data storage system and prior to the host performing discovery processing to discover paths between the host and data storage devices of the data storage system, each of said plurality of device identifiers being a unique device identifier.

5. The method of claim 1, wherein there is no device identifier attached to the second data storage device when said attaching is performed thereby indicating that the second data storage device is unavailable for data operations from any host and is not visible to any host.

6. The method of claim 1, wherein the first data storage device and the second data storage device are block devices whereby the application accesses data on the devices for data operations in terms of blocks using block-based addresses.

7. The method of claim 4, wherein the plurality of device identifiers are created by a device identifier factory on any of a host which stores data on the data storage system, a management computer system used to manage the data storage system, and the data storage system, and wherein the plurality of device identifiers are included in faces of a face group for the application, wherein operations of attaching and detaching one of the plurality of device identifiers, respectively, attaches and detaches a face including said one device identifier.

8. The method of claim 7, wherein each of the faces includes a different one of the plurality of device identifiers and one or more other properties.

9. The method of claim 8, wherein said one or more properties include any of a quality of service parameter, a capacity, a world wide name, a volume label, a description describing how a storage device attached to said each face is used by the application.

10. The method of claim 1, wherein the first data storage device is included in a first data storage system and a third device is included in a second data storage system and the first device identifier is attached to the third data storage device at a same time the first device identifier is attached to the first data storage device, said first data storage device and said third data storage device being configured as active mirrors of one another, wherein if the application writes first data to any one of the first and the third data storage devices, the first data is automatically replicated to the other of the first and the third data storage devices, said application performing data operations to the first data storage device over a first path between the host and the first data storage system and performing data operations to the third data storage device over a second path between the host and the second data storage system.

11. The method of claim 10, wherein a connection between the first and the second data storage systems used to replicate data between the first and the third data storage devices fails thereby disabling operations to automatically replicate written data between the first and the third data storage devices, and in response to the connection failing, the method includes:
    selecting one of the first and the third data storage devices; and
    detaching said first device identifier from said one storage device whereby said application issues data operations to the other of said first and said third data storage devices and is unable to issue data operations to said one data storage device.

12. The method of claim 1, wherein the first data storage device of a first data storage system and a third data storage device of a second data storage system are configured as mirrors of one another, wherein the third data storage device is not bound to any device identifier thereby indicating that the third data storage device is not accessible for I/O operations to any host, wherein if the application writes first data to the first data storage device, the first data is automatically replicated to the third data storage device, said application performing data operations to the first data storage device over a first path between the host and the first data storage system and the third data storage device is not accessible to the host over a path between the host and the second data storage system.

13. The method of claim 12, wherein if the first data storage device becomes unavailable to the application whereby the application is unable to access the first data storage device, then responsive to the first data storage device becoming unavailable to the application, the method further includes performing processing including:
    attaching the first device identifier to the third data storage device.

14. The method of claim 1, wherein, prior to attaching the first device identifier to the second data storage device, the method includes migrating data from the first data storage device to the second data storage device and stopping I/O operations from the application directed to the first device identifier, and wherein, after attaching the first device identifier to the second data storage device, the method includes resuming I/O operations from the application to the first device identifier.

15. The method of claim 14, wherein, after attaching the first device identifier to the second data storage device, the method includes creating a new device identifier, assigning the new device identifier to a second application, and attaching the new device identifier to the first data storage device thereby creating a path from the second application to the first data storage device, said second application issuing I/O operations directed to the new device identifier over the path.

16. A method of performing dynamic binding of device identifiers to data storage devices comprising:
    creating a first face that is assigned to an application on a host at a first point in time without having the first device identifier bound to any data storage device, said first face including a first device identifier that is a unique detachable device identifier dynamically bound to different data storage devices at different points in time in accordance with data storage devices used by the application, wherein said first identifier is assigned to the application at the first point in time and is not bound to any data storage device at the first point in time thereby not identifying any data storage device;
    attaching the first face to a first data storage device of a first data storage system, said first data storage device including a first set of data used by the application, wherein said attaching the first face to the first data storage device is performed subsequent to the first point in time and includes updating information on the data storage system to associate the first device identifier with a first data storage system internal identifier used locally by the data storage system to identify the first data storage device and makes the first data storage device available for data operations from the application;
    detaching the first face from the first data storage device thereby making the first data storage device unavailable for data operations of the application; and
    attaching the first face to a second data storage device of a second data storage system, said second data storage device including a second set of data used by the application at a second point in time, said attaching the first face to the second data storage device making the second data storage device available for data operations from the application.

17. A non-transitory computer readable medium comprising code stored thereon for performing dynamic binding of device identifiers to data storage devices, the non-transitory computer readable medium comprising code that, when executed, performs a method comprising:
    receiving a first device identifier that is assigned to an application on a host at a first point in time without having the first device identifier bound to any data storage device, said application having its data stored on a data storage system, said first device identifier being a unique detachable device identifier dynamically bound to different data storage devices at different points in time in accordance with data storage devices used by the application, wherein said first identifier is assigned to the application at the first point in time and is not bound to any data storage device at the first point in time thereby not identifying any data storage device;

attaching the first device identifier to a first data storage device of the data storage system, said first data storage device including a first set of data used by the application, wherein said attaching the first device identifier to the first data storage device is performed subsequent to the first point in time and includes updating information on the data storage system to associate the first device identifier with a first data storage system internal identifier used locally by the data storage system to identify the first data storage device and makes the first data storage device available for data operations from the application;

detaching the first device identifier from the first data storage device thereby making the first data storage device unavailable for data operations from the application; and attaching the first device identifier to a second data storage device that is different from the first data storage device, said second data storage device including a second set of data used by the application at a second point in time, said attaching the first device identifier to the second data storage device making the second data storage device available for data operations from the application.

18. The non-transitory computer readable medium of claim 17, wherein the first device identifier includes any one or more of a world wide name uniquely identifying a data storage device of the data storage system and a label written to a predetermined location on a data storage device to which the first device identifier is attached.

19. The non-transitory computer readable medium of claim 17, wherein the first device identifier is assigned to the application for a lifetime of the application and wherein performing said detaching of the first device identifier from the first data storage device and said attaching the first device identifier to the second data storage device results in the application using the second set of data rather than the first set of data without rebooting the host and without reconfiguring the application.

20. The non-transitory computer readable medium of claim 17, wherein the first device identifier is one of a plurality of device identifiers assigned to the first application prior to connecting the host to the data storage system and prior to the host performing discovery processing to discover paths between the host and data storage devices of the data storage system, each of said plurality of device identifiers being a unique device identifier.

* * * * *